US011882514B2

(12) United States Patent
Gan et al.

(10) Patent No.: US 11,882,514 B2
(45) Date of Patent: Jan. 23, 2024

(54) COMMUNICATIONS METHOD AND COMMUNICATIONS APPARATUS

(71) Applicant: Huawei Technologies Co., Ltd., Shenzhen (CN)

(72) Inventors: Ming Gan, Shenzhen (CN); Dandan Liang, Shenzhen (CN); Jian Yu, Shenzhen (CN); Yuchen Guo, Shenzhen (CN); Yunbo Li, Shenzhen (CN); Xun Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/965,457

(22) Filed: Oct. 13, 2022

(65) Prior Publication Data
US 2023/0050803 A1 Feb. 16, 2023

Related U.S. Application Data

(63) Continuation of application No. PCT/CN2021/086883, filed on Apr. 13, 2021.

(30) Foreign Application Priority Data
Apr. 14, 2020 (CN) .......................... 202010292203.8

(51) Int. Cl.
H04W 76/19 (2018.01)
H04W 40/24 (2009.01)

(52) U.S. Cl.
CPC ......... H04W 40/244 (2013.01); H04W 76/19 (2018.02)

(58) Field of Classification Search
CPC ... H04W 40/24; H04W 40/244; H04W 48/16; H04W 52/02; H04W 52/0203;
(Continued)

(56) References Cited

U.S. PATENT DOCUMENTS 11,343,766 B2   5/2022   Gan et al.
11,457,408 B2   9/2022   Choo et al.
(Continued)

FOREIGN PATENT DOCUMENTS

CN   101146045 A   3/2008
CN   108541047 A   9/2018
(Continued)

OTHER PUBLICATIONS

"IEEE P802.11axTM/D6.0 Draft standard for Informaiton technology—Telecommunications and information exchange between systems Local and metropolitan area networks—Specific requirements, Part 11: Wireless LAN Medium Access Control (MAC) and Physical Layer (PHY) Specifications, Amendment 1: Enhancements for High Efficiency WLAN," IEEE P802.11axTM/D6.0, Nov. 2019, 780 pages.

(Continued)

Primary Examiner — Jean A Gelin
(74) Attorney, Agent, or Firm — Slater Matsil, LLP

(57) ABSTRACT

This application provides a communications method and a communications apparatus. A first station in a first multi-link device sends first information to a second multi-link device, where the first information is used to indicate a frequency at which a station in a power saving mode in the first multi-link device receives a beacon frame. In this way, the second multi-link device may learn about, based on the first information, a frequency at which a station in the first multi-link device receives a beacon frame, thereby helping the second multi-link device effectively manage a cache service of each station in the first multi-link device and manage a data buffer space.

20 Claims, 10 Drawing Sheets

(58) Field of Classification Search
CPC ......... H04W 52/0216; H04W 52/0235; H04W 72/02; H04W 72/0446; H04W 76/19; H04W 76/15; H04W 76/28; H04W 76/34; H04W 76/38; H04W 88/06
See application file for complete search history.

(56) References Cited

U.S. PATENT DOCUMENTS

| | | | |
|---|---|---|---|
| 11,503,539 B2* | 11/2022 | Kim | H04W 52/0203 |
| 2010/0284316 A1* | 11/2010 | Sampathkumar | H04W 52/0216 370/311 |
| 2013/0121325 A1* | 5/2013 | McCann | H04W 48/12 370/338 |
| 2016/0205615 A1 | 7/2016 | Seok | |
| 2017/0006545 A1* | 1/2017 | Choi | H04W 52/0229 |
| 2018/0092039 A1* | 3/2018 | Cariou | H04W 52/0235 |
| 2018/0206190 A1 | 7/2018 | Cherian et al. | |
| 2019/0335454 A1 | 10/2019 | Huang et al. | |
| 2020/0137683 A1* | 4/2020 | Cariou | H04W 52/0216 |
| 2020/0137690 A1* | 4/2020 | Min | H04W 28/0273 |
| 2020/0374802 A1* | 11/2020 | Chu | H04W 52/0216 |
| 2021/0144698 A1* | 5/2021 | Kwon | H04W 76/14 |
| 2021/0144787 A1* | 5/2021 | Kwon | H04W 8/26 |
| 2021/0212156 A1* | 7/2021 | Kwon | H04W 88/06 |
| 2021/0250848 A1* | 8/2021 | Seok | H04W 36/06 |
| 2021/0321243 A1* | 10/2021 | Patil | H04W 76/15 |
| 2021/0321410 A1* | 10/2021 | Patil | H04W 76/19 |
| 2021/0360522 A1* | 11/2021 | Chitrakar | H04W 52/0206 |

FOREIGN PATENT DOCUMENTS

| | | |
|---|---|---|
| CN | 110267287 A | 9/2019 |
| WO | 2016091293 A1 | 6/2016 |
| WO | 2019044421 A1 | 3/2019 |
| WO | 2020040587 A1 | 2/2020 |
| WO | 2020040589 A1 | 2/2020 |
| WO | 2020050648 A1 | 3/2020 |

OTHER PUBLICATIONS

"IEEE Standard for Information technology—Telecommunications and information exchange between systems Local and metropolitan area networks—Specific requirements, Part 11: Wireless LAN Medium Access Control (MAC) and Physical Layer (PHY) Specifications," IEEE Standards Association, IEEE Std 802.11TM-2016 (Revision of IEEE Std 802.11-2012), Approved Dec. 7, 2016, 3534 pages.

* cited by examiner

| Element ID | Length | Action type | WNM sleep mode response status | WNM sleep interval |
|---|---|---|---|---|
| | | | | |

COMMUNICATIONS METHOD AND COMMUNICATIONS APPARATUS

CROSS-REFERENCE TO RELATED APPLICATIONS

This application is a continuation of International Application No. PCT/CN2021/086883, filed on Apr. 13, 2021, which claims priority to Chinese Patent Application No. 202010292203.8, filed on Apr. 14, 2020. The disclosures of the aforementioned applications are hereby incorporated by reference in their entireties.

TECHNICAL FIELD

This application relates to the communications field, and more specifically, to a communications method and a communications apparatus.

BACKGROUND

As defined in the IEEE 802.11 next-generation Wi-Fi extremely high throughput (EHT) protocol, ultra-large bandwidths may be used to transmit information packets on a new frequency band 6 GHz, and multiple discontinuous links may also be aggregated to form an ultra-large bandwidth by using a multi-link (ML) cooperative technology. The multi-link cooperative technology can aggregate larger bandwidths. In addition, the multi-link cooperative technology, such as sharing of MAC layers on multiple links, may be used to flexibly transmit message packets, or simultaneously send message packets of a same service to a same station. A wireless local area network (WLAN) device that supports the next-generation IEEE 802.11 standard has an ability to send and receive data on multiple bands (multi-band).

Currently, a conventional listening mechanism has limitations, and is applicable only to a single-link station, but not to a station where a multi-link device is deployed.

SUMMARY

In view of this, this application provides a communications method and a communications apparatus, to effectively manage a downlink cache service of a multi-link device and help manage a data buffer space.

According to a first aspect, a communications method is provided. The communications method includes: First, a first station in a first multi-link device sends first information to a second multi-link device, where the first information is used to indicate how often a station in a power saving mode in the first multi-link device receives a beacon frame. Then, the first multi-link device receives the beacon frame based on the first information. In this way, the second multi-link device can learn about how often a station in the first multi-link device receives a beacon frame, thereby effectively managing a cache service of each station in the first multi-link device and managing a data buffer space.

The first station may be a station in the first multi-link device. Alternatively, the first multi-link device is a special multi-link device, namely, a multi-link device including a single station.

Optionally, the first station is a station that is in the first multi-link device and that is used to establish an association request.

In a possible implementation, the first information indicates a first time interval at which a second station operating on a first link in the first multi-link device receives a beacon frame, and a unit of the first time interval is an interval of beacon frames on the first link. In other words, the first time interval is related to an interval at which a third station operating on the first link in the second multi-link device sends the beacon frame. The first multi-link device notifies the second multi-link device of the first time interval (or referred to as a listen interval) at which a station operating on the first link receives a beacon frame. In this way, the second multi-link device can effectively manage a cache service of each station in the first multi-link device based on the first time interval and manage a data buffer space.

Herein, the first link may be referred to as a primary link, and there is one first link.

Optionally, the first station is the same as or different from the second station.

Optionally, that the first multi-link device receives the beacon frame based on the first information includes: A station in the first multi-link device receives the beacon frame on the first link at an interval of the first time interval. Herein, the station in the first multi-link device may receive the beacon frame on the first link based on the first time interval, to learn about BSS parameter information sent by the second multi-link device. For example, the station in the first multi-link device learns about a downlink service indication through the beacon frame, and then notifies an AP that the station is in an awake state through a power-saving poll frame, to finally help the AP complete downlink service transmission.

In another possible implementation, the first information indicates a second time interval at which a plurality of stations operating on a plurality of links in the first multi-link device receive a beacon frame, and the second time interval is related to a plurality of beacon frame intervals at which the second multi-link device sends a beacon frame on the plurality of links, where each beacon frame interval is an interval at which a station in the second multi-link device sends a beacon frame on a link. The first multi-link device notifies the second multi-link device of the second time interval (or referred to as a listen interval) at which the plurality of stations operating on the plurality of links receive the beacon frame. In this way, the second multi-link device can effectively manage the cache service of each station in the first multi-link device based on the second time interval and manage a data buffer space.

Optionally, a unit of the second time interval is a largest time interval in the plurality of beacon frame intervals at which the second multi-link device sends a beacon frame on the plurality of links, or a smallest time interval in the plurality of beacon frame intervals. In other words, the unit of the second time interval may be a smallest value or a largest value in the plurality of beacon frame intervals.

Optionally, that the first multi-link device receives the beacon frame based on the first information includes: The first multi-link device receives the beacon frame on at least one of the plurality of links at an interval of the second time interval. Herein, the first multi-link device may receive the beacon frame on the first link based on the second time interval, to learn about BSS parameter information sent by the second multi-link device. For example, the station in the first multi-link device learns about a downlink service indication through the beacon frame, and then notifies an AP that the station is in an awake state through a power-saving poll frame, to finally help the AP complete downlink service transmission.

Herein, a plurality of stations (namely, all stations operating on a plurality of links) in the first multi-link device may receive the beacon frame on each of the plurality of links, namely, all of the plurality of links, at an interval of the second time interval. Alternatively, some stations (namely, stations operating on some of a plurality of links) in the first multi-link device may receive the beacon frame on some of the plurality of links at an interval of the second time interval.

In this embodiment of this application, that the first station in the first multi-link device sends the first information to the second multi-link device includes: The first station in the first multi-link device sends the first frame to the second multi-link device, where the first frame carries the first information. The first frame may be a management frame, for example, the first frame is an association request frame or a re-association request frame. Therefore, a manner of sending the first information is relatively flexible.

According to a second aspect, a communications method is provided. The communications method includes: First, a second multi-link device receives first information from a first multi-link device, where the first information is used to indicate how often a station in a power saving mode in the first multi-link device receives a beacon frame. Then, the second multi-link device sends the beacon frame based on the first information. In this way, the second multi-link device can learn about how often a station in the first multi-link device receives a beacon frame, and send a beacon frame based on the first information, so that the second multi-link device can effectively manage a cache service of each station in the first multi-link device and manage a data buffer space.

Optionally, the method further includes: The second multi-link device determines a lifetime of a service of the first multi-link device based on the first information.

Optionally, the method further includes: When time that the second multi-link device caches the service of the first multi-link device is less than time indicated by the first information, the second multi-link device skips discarding a cache service of the first multi-link device.

Optionally, that the second multi-link device manages the service of the first multi-link device based on the first information includes: When the time that the second multi-link device caches the service of the first multi-link device is greater than the time indicated by the first information, the second multi-link device discards the cache service of the first multi-link device.

Optionally, that the second multi-link device receives the first information from the first multi-link device includes: The second multi-link device receives a first frame from the first multi-link device, where the first frame carries the first information. The first frame may be a management frame, for example, the first frame is an association request frame or a re-association request frame. Therefore, a manner of sending the first information is relatively flexible.

According to a third aspect, a communications method is provided. The communications method includes: First, a first station in a first multi-link device sends a first frame to a second multi-link device, where the first frame includes a plurality of pieces of second information, and each of the plurality of pieces of second information is used to indicate how often each station in a power saving mode in the first multi-link device receives a beacon frame. Then, the first multi-link device receives the beacon frame based on the plurality of pieces of second information. In this way, the second multi-link device learns about a plurality of pieces of second information, thereby effectively managing a cache service of each station in the first multi-link device and managing a data buffer space.

Optionally, the first frame further includes link identifiers of a plurality of stations, each link identifier corresponds to one piece of second information, and the link identifier is used to identify a station in the first multi-link device. In this way, the second multi-link device may learn about a correspondence between a piece of second information and a station.

The first frame may be a management frame, for example, the first frame is an association request frame or a re-association request frame. A manner of sending the plurality of pieces of second information is relatively flexible.

According to a fourth aspect, a communications method is provided. The communications method includes: First, a second multi-link device receives a first frame, where the first frame includes a plurality of pieces of second information and each of the plurality of pieces of second information is used to indicate how often each station in a power saving mode in a first multi-link device receives a beacon frame. Then, the second multi-link device sends a beacon frame based on the plurality of pieces of second information. In this way, the second multi-link device can learn about a plurality of pieces of second information, thereby effectively managing a cache service of each station in the first multi-link device and managing a data buffer space.

Optionally, the first frame further includes link identifiers of a plurality of stations, each link identifier corresponds to one piece of second information, and the link identifier is used to identify a station in the first multi-link device. In this way, the second multi-link device may learn about a correspondence between a piece of second information and a station.

The first frame may be a management frame, for example, the first frame is an association request frame or a re-association request frame. A manner of sending the plurality of pieces of second information is relatively flexible.

According to a fifth aspect, a communications apparatus is provided. The communications apparatus includes a module configured to perform the method in the first aspect or any possible implementation of the first aspect, a module configured to perform the method in the second aspect or any possible implementation of the second aspect, a module configured to perform the method in the third aspect or any possible implementation of the third aspect, or a module configured to perform the method in the fourth aspect or any possible implementation of the fourth aspect.

According to a sixth aspect, a communications apparatus is provided. The communications apparatus includes a processor. The processor is coupled to a memory, and may be configured to execute instructions in the memory, to implement the method in any possible implementation of the first aspect or the third aspect. Optionally, the apparatus further includes the memory. Optionally, the apparatus further includes a communications interface, and the processor is coupled to the communications interface.

In an implementation, the apparatus is a first multi-link device. When the apparatus is a first multi-link device, the communications interface may be a transceiver, or an input/output interface.

In another implementation, the apparatus is a chip disposed in the first multi-link device. When the apparatus is a chip disposed in the first multi-link device, the communications interface may be an input/output interface.

Optionally, the transceiver may be a transceiver circuit. Optionally, the input/output interface may be an input/output circuit.

According to a seventh aspect, a communications apparatus is provided. The communications apparatus includes a processor. The processor is coupled to a memory, and may be configured to read and execute instructions in the memory, to implement the method according to any possible implementation of the second aspect or the fourth aspect. Optionally, the apparatus further includes the memory. Optionally, the apparatus further includes a communications interface, and the processor is coupled to the communications interface.

In an implementation, the apparatus is a second multi-link device. When the apparatus is a second multi-link device, the communications interface may be a transceiver, or an input/output interface.

In another implementation, the apparatus is a chip disposed in the second multi-link device. When the apparatus is a chip disposed in the second multi-link device, the communications interface may be an input/output interface.

Optionally, the transceiver may be a transceiver circuit. Optionally, the input/output interface may be an input/output circuit.

According to an eighth aspect, a processor is provided, and includes an input circuit, an output circuit, and a processing circuit. The processing circuit is configured to receive a signal through the input circuit and transmit a signal through the output circuit, so that the processor performs the method in any possible implementation of any one of the first aspect to the fourth aspect.

During specific implementation, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the circuits are not limited in embodiments of this application.

According to a ninth aspect, an apparatus is provided, and includes a processor and a memory. The processor is configured to read instructions stored in the memory, receive a signal through a receiver, and transmit a signal through a transmitter, to perform the method in any possible implementation of any one of the first aspect to the fourth aspect.

Optionally, there are one or more processors, and there are one or more memories.

Optionally, the memory may be integrated with the processor, or the memory and the processor are separately disposed.

In a specific implementation process, the memory may be a non-transitory memory, for example, a read-only memory (read only memory, ROM). The memory and the processor may be integrated on a same chip, or may be separately disposed on different chips. A type of the memory and a manner of disposing the memory and the processor are not limited in embodiments of this application.

It should be understood that a related data exchange process, for example, sending first information or a first frame, may be a process in which the first information or the first frame is output from the processor, and receiving capability information may be a process in which the processor receives input capability information. Specifically, data output by the processor may be output to a transmitter, and input data received by the processor may come from a receiver. The transmitter and the receiver may be collectively referred to as a transceiver.

The apparatus in the ninth aspect may be a chip. The processor may be implemented by using hardware or software. When the processor is implemented by using hardware, the processor may be a logic circuit, an integrated circuit, or the like; or when the processor is implemented by using software, the processor may be a general-purpose processor, and is implemented by reading software code stored in the memory. The memory may be integrated into the processor, or may exist independently outside the processor.

According to a tenth aspect, a computer-readable storage medium is provided. The computer-readable storage medium stores a computer program or instructions. When the computer program or the instructions are executed, the method in any possible implementation of any one of the first aspect to the fourth aspect is implemented.

According to an eleventh aspect, a computer program product including instructions is provided. When the instructions are run, the method in any possible implementation of any one of the first aspect to the fourth aspect is implemented.

According to a twelfth aspect, a communications chip is provided, where instructions are stored. When the instructions run on a computer device, the communications chip is enabled to perform the method in the first aspect or any possible implementation of the first aspect, or the communications chip is enabled to perform the method in the third aspect or any possible implementation of the third aspect.

According to a thirteenth aspect, a communications chip is provided, where instructions are stored. When the instructions run on a computer device, the communications chip is enabled to perform the method in the second aspect or any possible implementation of the second aspect, or the communications chip is enabled to perform the method in the fourth aspect or any possible implementation of the fourth aspect.

According to a fourteenth aspect, a communications system is provided, where the communications system includes a first multi-link device and a second multi-link device.

Optionally, the communications system further includes another device that communicates with the first multi-link device and/or the second multi-link device.

DETAILED DESCRIPTION OF ILLUSTRATIVE EMBODIMENTS

Figure 1:
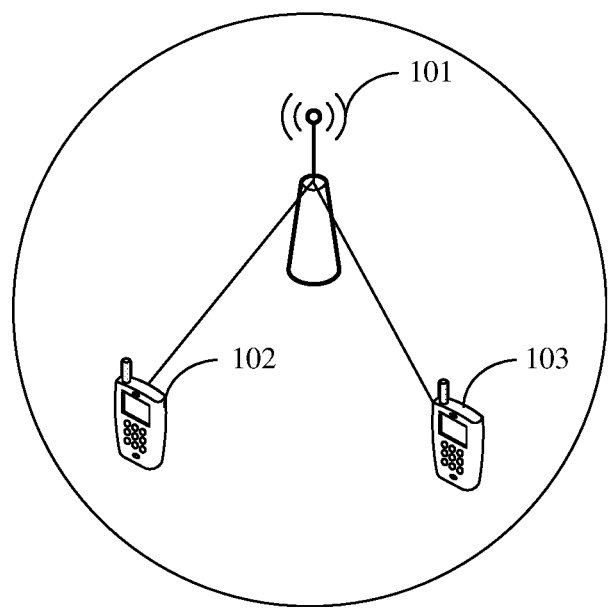
FIG. 1 is an example diagram of an application scenario according to an embodiment of this application.

The following describes technical solutions of this application with reference to accompanying drawings.

The technical solutions provided in embodiments of this application can be applied to various communications systems, such as a long term evolution (LTE) system, an LTE frequency division duplex (FDD) system, an LTE time division duplex (TDD), a Wi-Fi system, a wireless local area network (WLAN), a worldwide interoperability for microwave access (WiMAX) communications system, a 5th generation (5G) system or new radio (NR), or a device to device (D2D) system.

In a communications system, if one device sends data to another device or receives data sent by another device, the another device receives data sent by the data sending device and/or sends data to the data sending device.

The technical solutions provided in embodiments of this application can be applied to wireless communications between communications devices. Specifically, this embodiment of this application is applied to communications between multi-link devices. The wireless communications between the communications devices may include wireless communications between a network device and a terminal device, wireless communications between network devices, and wireless communications between terminals. In embodiments of this application, the term "wireless communication" may be referred to as "communication", and the term "communication" may also be described as "data transmission", "information transmission", or "transmission".

The terminal device may be a station (STA), user equipment, an access terminal, a user unit, a subscriber station, a mobile station, a remote station, a remote terminal, a mobile device, a user terminal, a terminal, a wireless communications device, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communications function, a computing device, another processing device connected to a wireless modem, a vehicle-mounted device, a wearable device, a terminal device in a future 5G network, a terminal device in a future evolved public land mobile network (PLMN), or the like. This is not limited in embodiments of this application.

The network device may be a device configured to communicate with the terminal device, or may be referred to as a radio access network (RAN) device, or the like. The network device includes but is not limited to an access point (AP), a next generation nodeB (gNB) in 5G, an evolved node B (eNB), a baseband unit (BBU), a transmitting and receiving point (TRP), a transmitting point (TP), a relay station, or the like. The network device may alternatively be a radio controller in a cloud radio access network (CRAN) scenario. In addition, the network device may be further responsible for functions such as radio resource management on an air interface side, quality of service (QoS) management, and data compression and encryption. The network device can support at least one wireless communications technology, such as LTE or NR.

In some deployments, the gNB may include a centralized unit (CU) and a distributed unit (DU). The gNB may further include an active antenna unit (AAU). The CU implements some functions of the gNB, and the DU implements some functions of the gNB. For example, the CU is responsible for processing a non-real-time protocol and service, and implements functions of a radio resource control (RRC) layer and a packet data convergence protocol (PDCP) layer. The DU is responsible for processing a physical layer protocol and a real-time service, and implements functions of a radio link control (RLC) layer, a media access control (MAC) layer, and a physical (PHY) layer. The AAU implements some processing functions of the physical layer, radio frequency processing, and a function related to an active antenna. Information at the RRC layer eventually becomes information at the PHY layer, or is changed from information at the PHY layer. Therefore, in this architecture, higher layer signaling such as RRC layer signaling may also be considered as being sent by the DU or sent by the DU and the AAU. It may be understood that the network device may be a device including one or more of a CU node, a DU node, and an AAU node. In addition, the CU may be a network device in an access network (RAN), or may be a network device in a core network (CN). This is not limited in this application.

In embodiments of this application, the terminal device or the network device includes a hardware layer, an operating system layer running above the hardware layer, and an application layer running above the operating system layer. The hardware layer includes hardware such as a central processing unit (CPU), a memory management unit (MMU), and a memory (which is also referred to as a main memory). The operating system may be any one or more computer operating systems that implement service processing through a process, for example, a Linux operating system, a Unix operating system, an Android operating system, an iOS operating system, or a Windows operating system. The application layer includes applications such as a browser, an address book, word processing software, and instant messaging software. In addition, a specific structure of an entity for performing a method provided in embodiments of this application is not particularly limited in embodiments of this application, provided that the entity can run a program that records code of the method provided in embodiments of this application to perform communications according to the method provided in embodiments of this application. For example, the entity for performing the method provided in embodiments of this application may be a terminal device, a network device, or a functional module that is in a terminal device or a network device and that can invoke and execute the program.

In addition, aspects or features of this application may be implemented as a method, an apparatus, or a product that uses standard programming and/or engineering technologies. The term "product" used in this application covers a computer program that can be accessed from any computer-readable device, carrier or medium. For example, the computer-readable medium may include but is not limited to: a magnetic storage component (for example, a hard disk, a floppy disk, or a magnetic tape), an optical disc (for example, a compact disc (CD) and a digital versatile disc (DVD)), a smart card, and a flash memory component (for example, an erasable programmable read-only memory (EPROM), a card, a stick, or a key drive). In addition, various storage media described in this specification may represent one or more devices and/or other machine-readable media that are configured to store information. The term "machine-readable media" may include but is not limited to radio channels and various other media that can store, include, and/or carry instructions and/or data.

This application is applicable to a communications system including a multi-link device (MLD). The following briefly describes the multi-link device.

An MLD is also referred to as a multi-band device. A multi-link device includes one or more affiliated stations, and the affiliated station is a logical station. "A multi-link device includes an affiliated station" is also briefly described as "A multi-link device includes a station" in embodiments of this application. An affiliated station may be an access point AP or a non-access point station (non-AP STA). For ease of description, in this application, a multi-link device whose affiliated station is an AP may be referred to as a multi-link AP, a multi-link AP device, or an AP multi-link device, and a multi-link device whose affiliated station is a non-AP STA may be referred to as a multi-link STA, a multi-link STA device, or a STA multi-link device.

The MLD may implement wireless communications in compliance with an 802.11 series protocol, for example, in compliance with Extremely High Throughput (EHT), or in compliance with 802.11be-based or 802.11be-compatible protocol, thereby implementing communications with another device. The another device may be a multi-link device or may not be a multi-link device.

Each logical station may operate on one link, but a plurality of logical stations are allowed to operate on a same link. A link identifier mentioned below identifies (or represents) one station operating on one link. In other words, if there is more than one logical station on one link, more than one link identifier is required to identify (or represent) the logical stations. The link identifier mentioned below sometimes also indicates a station operating on the link. In a case in which data transmission is performed between a multi-link device and another multi-link device, before communication, the multi-link device and the another multi-link device may first negotiate or communicate with each other about a correspondence between a link identifier and a link or a station on a link, or an AP multi-link device indicates a correspondence between a link identifier and a link or a station on a link through a broadcast management frame (for example, a beacon frame). Therefore, during data transmission, a link identifier is carried without a need of transmitting a large amount of signaling information to indicate a link or a station on a link. This reduces signaling overheads and improves transmission efficiency.

The following uses an example in which the foregoing one multi-link device is an AP multi-link device, and the foregoing another multi-link device is a STA multi-link device for description.

In an example, when the AP multi-link device establishes a basic service set (BSS), a management frame (for example, a beacon frame) sent by the AP multi-link device carries an element including a plurality of link identifier information fields. Each link identifier information field is used to indicate a correspondence between a link identifier and a station operating on a link. Each link identifier information field includes a link identifier. Optionally, each link identifier information field further includes one or more of a MAC address, an operating class, and a channel number. One or more of the MAC address, the operating class, and the channel number may identify a link or a station operating on the link.

In another example, in a multi-link association process, the AP multi-link device and the STA multi-link device negotiate a plurality of link identifier information fields. In subsequent communication, the AP multi-link device or the STA multi-link device identifies (or represents) a station in the multi-link device by using a link identifier. Optionally, the link identifier may further identify (or represent) one or more attributes of a MAC address, a working operating class, and a channel number of the station. There may be a correspondence between a link identifier and one or more attributes of a station. The MAC address may also be replaced with an association identifier of the associated AP multi-link device. Optionally, if a plurality of stations operate on one link, meanings identified (or represented) by a link identifier (which is a numeric ID) include not only an operating class in which the link is located and a channel number, but also an identifier of a station operating on the link, for example, a MAC address or an association identifier (AID) of a station.

FIG. 1 is an example diagram of an application scenario to which an embodiment of this application is applied. As shown in FIG. 1, a wireless local area network includes a first station 101 and a second station 102. A plurality of links may be used for communications between the first station 101 and the second station 102, to improve a throughput. The first station 101 may be a multi-link device, and the second station 102 may be a single-link device, a multi-link device, or the like. For example, in a scenario, the first station 101 is an AP multi-link device, and the second station 102 is a STA multi-link device or a station (for example, a single-link station). In another scenario, the first station 101 is a STA multi-link device, and the second station 102 is an AP (for example, a single-link AP) or an AP multi-link device. For example, in still another scenario, the first station 101 is an AP multi-link device, and the second station 102 is an AP multi-link device or an AP. For example, in still another scenario, the first station 101 is a STA multi-link device, and the second station 102 is a STA multi-link device or a STA.

It may be understood that a quantity and a type of devices shown in FIG. 1 are merely examples, and do not constitute a limitation on this embodiment of this application. Actually, the wireless local area network in FIG. 1 may further include another device.

Figure 2:
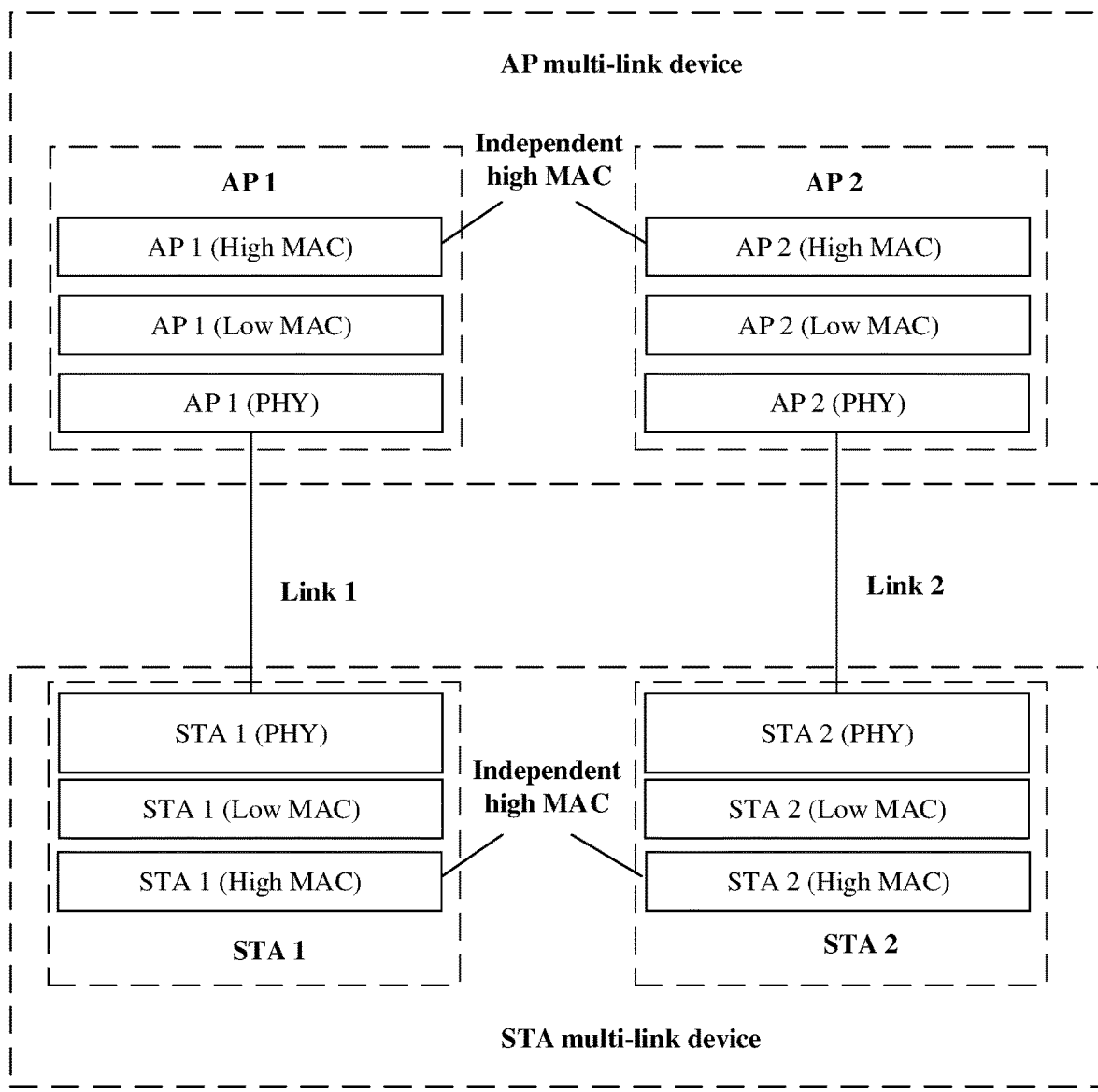
FIG. 2 is an example diagram of structures of an AP multi-link device and a STA multi-link device that participate in communication.
Figure 3:
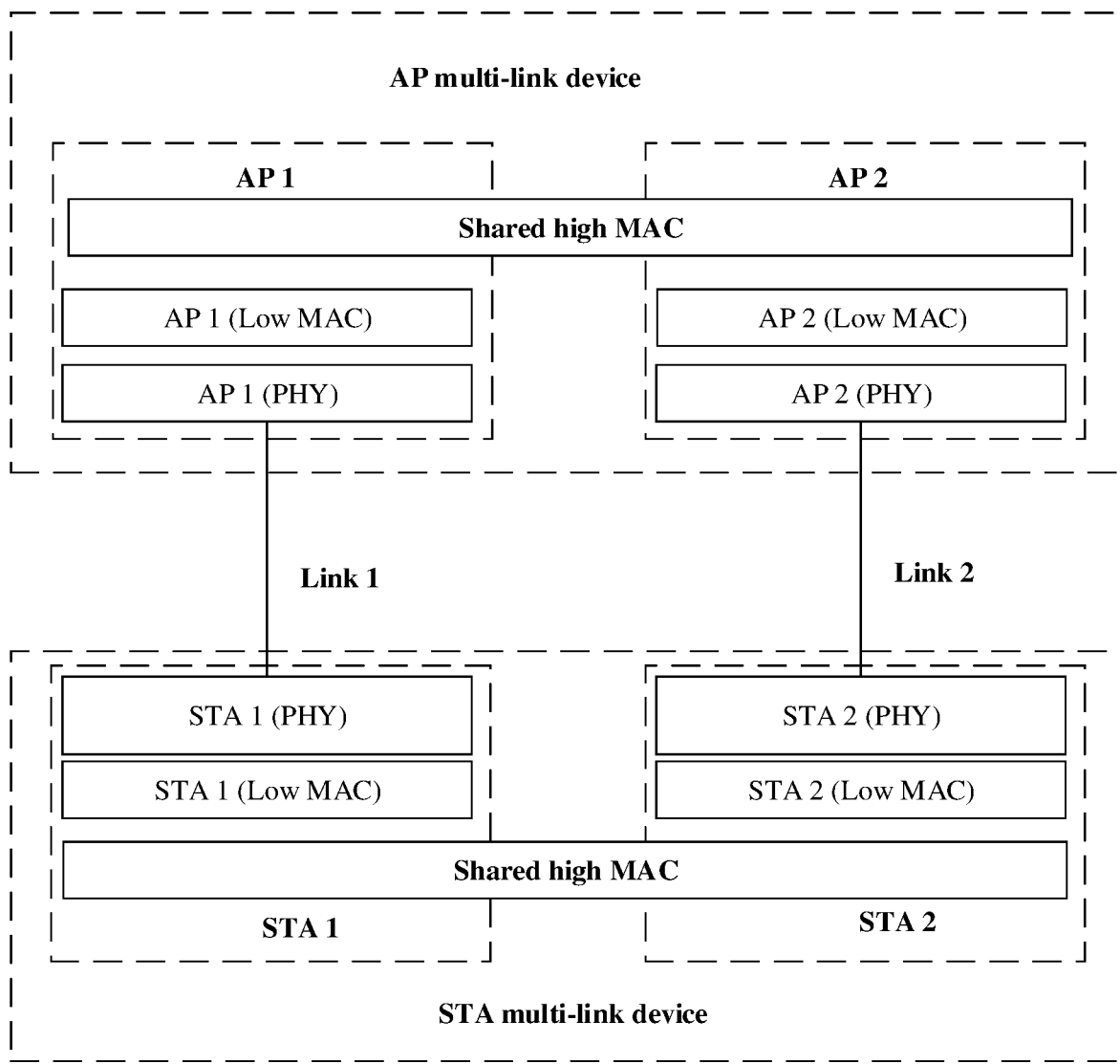
FIG. 3 is another example diagram of structures of an AP multi-link device and a STA multi-link device that participate in communication.

FIG. 2 and FIG. 3 are schematic diagrams of structures of an AP multi-link device and a STA multi-link device that participate in communication. 802.11 standards focus on 802.11 physical layer (PHY) and media access control (MAC) layer parts of an AP multi-link device and a STA multi-link device (such as a mobile phone and a notebook computer).

As shown in FIG. 2, a plurality of APs included in the AP multi-link device are independent of each other at a low MAC layer and a PHY layer, and are also independent of each other at a high MAC layer. A plurality of STAs included in the STA multi-link device are independent of each other at a low MAC layer and a PHY layer, and are also independent of each other at a high MAC layer.

As shown in FIG. 3, a plurality of APs included in the AP multi-link device are independent of each other at a low MAC layer and a PHY layer, and share a high MAC layer. A plurality of STAs included in the STA multi-link device are independent of each other at a low MAC layer and a PHY layer, and share a high MAC layer.

It may be understood that structures shown in FIG. 2 and FIG. 3 are merely examples, and do not constitute a limitation on this embodiment of this application. For example, the STA multi-link device may use a structure in which high MAC layers are independent of each other, and the AP multi-link device may use a structure in which a high MAC layer is shared. Alternatively, the STA multi-link device may use a structure in which a high MAC layer is shared, and the AP multi-link device may use a structure in which high MAC layers are independent of each other. For example, the high MAC layer or the low MAC layer may be implemented by one processor in a chip system of the multi-link device, or may be implemented by different processing modules in a chip system.

Figure 4:
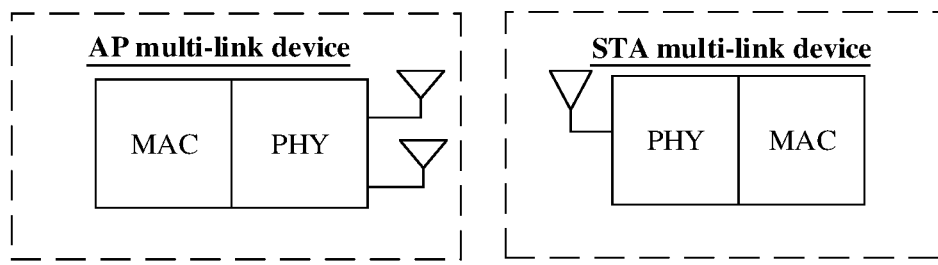
FIG. 4 is an example diagram of an antenna of a multi-link device.

It may be understood that the multi-link device in this embodiment of this application may be a single-antenna device, or may be a multi-antenna device. For example, the multi-link device may be a device with more than two antennas. A quantity of antennas included in the multi-link device is not limited in embodiments of this application. FIG. 4 shows an example in which an AP multi-link device is a multi-antenna device and a STA multi-link device is a single-antenna device. It may be understood that the schematic diagram in FIG. 4 is merely an example, and does not constitute a limitation on this embodiment of this application. In this embodiment of this application, the multi-link device may allow services of a same access type to be transmitted on different links, or even allow same data packets to be transmitted on different links. Alternatively, the multi-link device may not allow services of a same access type to be transmitted on different links, but may allow services of different access types to be transmitted on different links.

Figure 5:
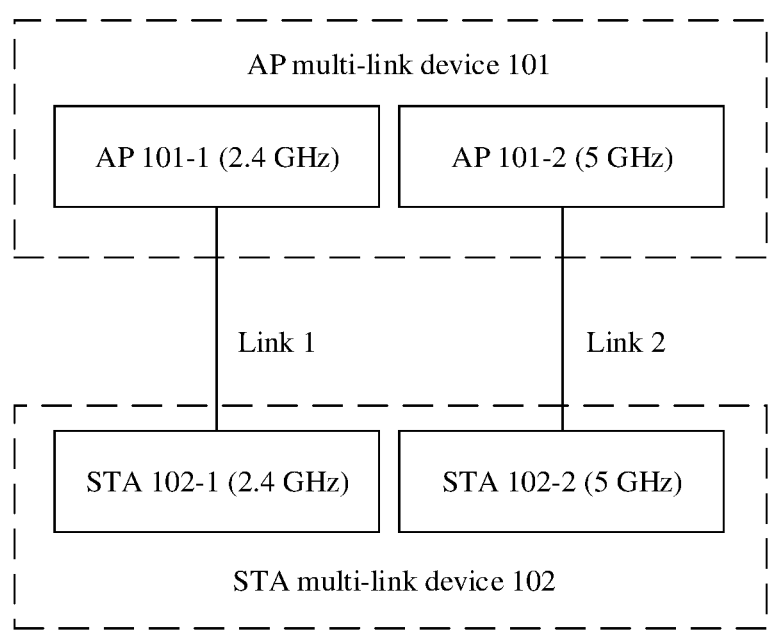
FIG. 5 is an example diagram of a scenario in which an AP multi-link device communicates with a STA multi-link device.
Figure 6:
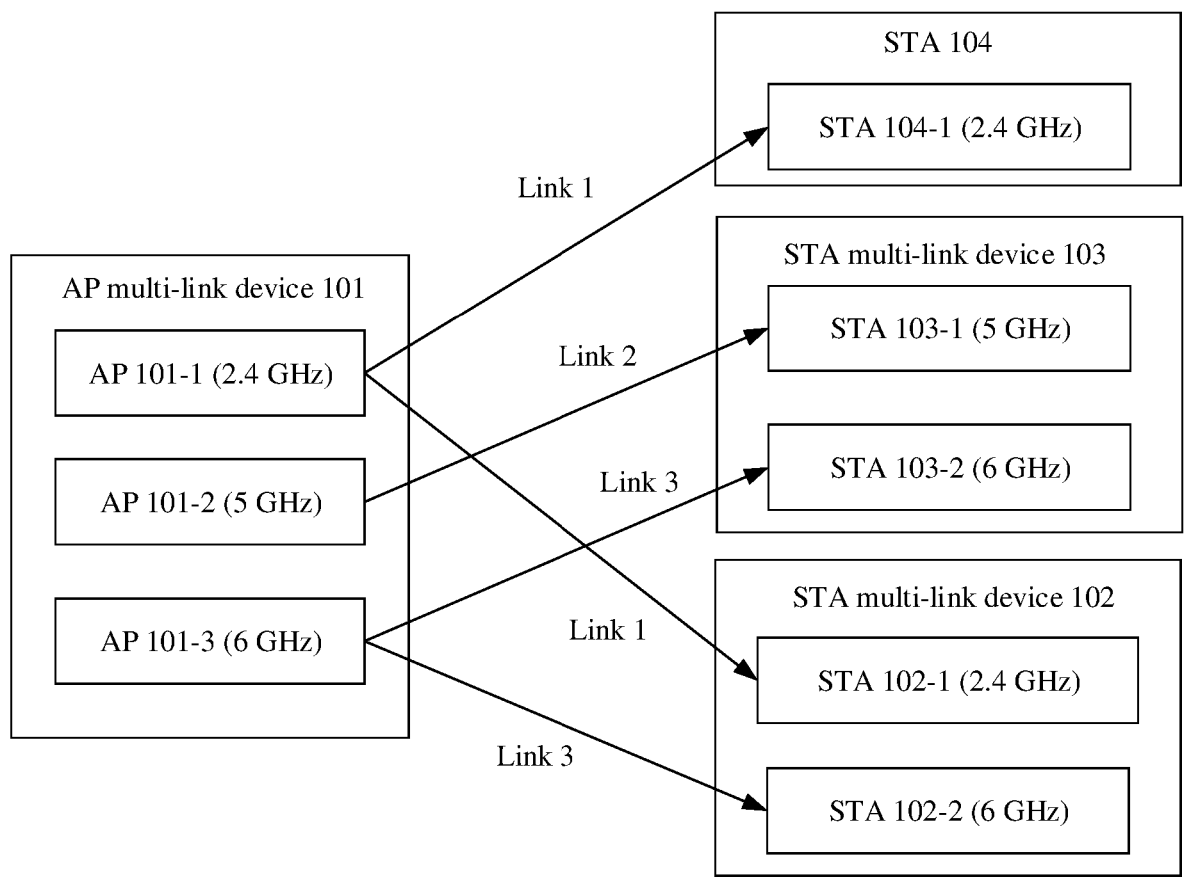
FIG. 6 is another example diagram of a scenario in which an AP multi-link device communicates with a STA multi-link device.

It may be further understood that the multi-link device in this embodiment of this application may operate on a plurality of frequency bands. For example, a frequency band on which the multi-link device operates may include but is not limited to sub 1 GHz, 2.4 GHz, 5 GHz, 6 GHz, and a high frequency 6o GHz. Examples shown in FIG. 5 and FIG. 6 are used for description herein. FIG. 5 and FIG. 6 are two schematic diagrams showing that a multi-link device communicates with another device through a plurality of links in a wireless local area network.

FIG. 5 shows a scenario in which an AP multi-link device 101 communicates with a STA multi-link device 102. As shown in FIG. 5, the AP multi-link device 101 includes an affiliated AP 101-1 and an affiliated AP 101-2, the STA multi-link device 102 includes an affiliated STA 102-1 and an affiliated STA 102-2, and the AP multi-link device 101 and the STA multi-link device 102 communicate in parallel through link 1 and link 2.

FIG. 6 shows a scenario in which an AP multi-link device 101 communicates with a STA multi-link device 102, a STA multi-link device 103, and a STA 104. The AP multi-link device 101 includes affiliated AP 101-1 to AP 101-3. The STA multi-link device 102 includes two affiliated STAs: STA 102-1 and STA 102-2. The STA multi-link device 103 includes two affiliated STAs: STA 103-1 and STA 103-2. The STA 104 is a single-link device. The AP multi-link device 101 may separately communicate with the STA multi-link device 102 through link 1 and link 3, communicate with the STA multi-link device 103 through link 2 and link 3, and communicate with the STA 104 through link 1. In an example, the STA 104 operates on a 2.4 GHz frequency band. The STA multi-link device 103 includes the STA 103-1 and the STA 103-2, where the STA 103-1 operates on a 5 GHz frequency band, and the STA 103-2 operates on a 6 GHz frequency band. The STA multi-link device 102 includes the STA 102-1 and the STA 102-2, where the STA 102-1 operates on a 2.4 GHz frequency band, and the STA 102-2 operates on a 6 GHz frequency band. The AP 101-1 operating on the 2.4 GHz frequency band in the AP multi-link device 101 may perform uplink or downlink data transmission with the STA 104 and the STA 102-1 in the STA multi-link device 102 through link 1. The AP 101-2 operating on the 5 GHz frequency band in the AP multi-link device 101 may perform uplink or downlink data transmission with the STA 103-1 operating on the 5 GHz frequency band in the STA multi-link device 103 through link 2. The AP 101-3 operating on the 6 GHz frequency band in the AP multi-link device 101 may perform uplink or downlink data transmission with the STA 102-2 operating on the 6 GHz frequency band in the STA multi-link device 102 through link 3, and may also perform uplink or downlink data transmission with the STA 103-2 in the STA multi-link device through link 3.

It should be noted that FIG. 5 shows that the AP multi-link device supports only two frequency bands, and FIG. 6 only uses an example in which the AP multi-link device supports three frequency bands (2.4 GHz, 5 GHz, and 6 GHz), each frequency band corresponds to one link, and the AP multi-link device 101 may operate on one or more of link 1, link 2, and link 3 for illustration. On an AP or STA side, a link (There are two explanations for a link. One explanation is a site (by considering that there are a plurality of stations operating on a same link). Another explanation is the link itself.) can also be understood as a station operating on the link. In an actual application, the AP multi-link device and the STA multi-link device may further support more or fewer frequency bands, that is, the AP multi-link device and the STA multi-link device may operate on more or fewer links. This is not limited in this embodiment of this application.

For example, the multi-link device is an apparatus with a wireless communications function, and the apparatus may be a device, or may be a chip, a processing system, or the like installed on the device. The device on which the chip or the processing system is installed may implement the method and function in the embodiment of this application under control of the chip or the processing system. For example, the multi-link STA in this embodiment of this application has a wireless transceiver function, may support the 802.11 series protocol, and may communicate with the multi-link AP, another multi-link STA, or a single-link device. For example, the multi-link STA is any user communications device that allows a user to communicate with an AP and in turn to communicate with the WLAN. For example, the multi-link STA may be user equipment that can be connected to the Internet such as a tablet, a desktop, a laptop, or a notebook computer, an ultra-mobile personal computer (UMPC), a handheld computer, a netbook, a personal digital assistant (PDA), or a mobile phone, an internet of things node in internet of things, an in-vehicle communications apparatus in internet of vehicles, or the like. The multi-link STA may further be a chip and a processing system in the foregoing terminals. The multi-link AP in this embodiment of this application is an apparatus that provides a service for the multi-link STA and may support the 802.11 series protocols. For example, the multi-link AP may be a communications entity such as a communications server, a router, a switch, or a network bridge, or the multi-link AP may include various forms of macro base stations, micro base stations, relay stations, or the like. Certainly, the multi-link AP may further be a chip and a processing system in the various forms of devices, to implement the method and function of this embodiment of this application. In addition, the multi-link device may support high-rate and low-latency transmission. With continuous evolution of wireless local area network application scenarios, the multi-link device may be further applied to more scenarios, for example, serving as a sensor node (for example, a smart water meter, a smart electricity meter, or a smart air detection node) in a smart city, a smart device (for example, a smart camera, a projector, a display screen, a TV, a stereo, a refrigerator, a washing machine, or the like) in a smart home, a node in internet of things, an entertainment terminal (for example, AR, VR, or another wearable device), a smart device (for example, a printer, a projector, or the like) in a smart office, an internet of vehicles device in internet of vehicles, or infrastructure (for example, a vending machine, a self-service navigation console, a self-checkout device, a self-service food machine, or the like) in daily lifetime scenarios. Specific forms of the multi-link STA and the multi-link AP are not specifically limited in embodiments of this application, and are merely examples for description herein. The 802.11 series protocol may include 802.11be, 802.11ax, 802.11a/b/g/n/ac, and the like.

In one BSS, an AP manages a plurality of stations. The AP may be an AP in an AP multi-link device or a single AP. Similarly, a station may be a station in a STA multi-link device or a single station. Each AP in the AP multi-link device may independently establish one BSS. Each AP periodically broadcasts a beacon frame, and beacon frame intervals may be different.

For a unified description, the communications method in this embodiment of this application is applicable to the following cases: (1) The AP is a single AP, and the station is a single station. (2) The AP is from an AP multi-link device. (3) The station is from a STA multi-link device, and the AP is a single AP. (4) The AP is from an AP multi-link device, and the station is from a STA multi-link device.

A single station can be considered as a station from a special STA multi-link device. The special STA multi-link device includes one station, but the station can be switched to another link for transmission. A single AP can be considered as an AP from a special AP multi-link device. The special AP multi-link device includes one AP, but the AP can be switched to another link for transmission. The link herein may also be understood as a channel. A STA multi-link device and an AP multi-link device are used as examples. A station in the STA multi-link device discovers surrounding APs by scanning, for example, active scanning or passive scanning, and then selects an appropriate AP for association, where the AP belongs to the AP multi-link device.

The following briefly explains an association between a STA multi-link device and an AP multi-link device. To reduce unnecessary interaction overheads, the STA multi-link device associates a station on one link in the STA multi-link device with one AP that is in the AP multi-link device and operates on the same link as the station. In this way, one or more stations in the STA multi-link device are associated with corresponding one or more APs in the AP multi-link device, that is, each station does not need to be separately associated with each AP. All stations or APs in the multi-link device have their own MAC addresses. Generally, different stations (or APs) in a same multi-link device have different MAC addresses. In addition, the STA (or AP) multi-link device has a common multi-link MAC address.

The common multi-link MAC address may be the same as a MAC address of one station (or AP) in the multi-link device, and the multi-link MAC address is also different from a MAC address of any station (or AP) in the multi-link device. Currently, association establishment includes one or more interactions of a probe request frame/a probe response frame, an authentication request frame/an authentication response frame, an association request frame/an association response frame, and a re-association request frame/a re-association response frame. To distinguish from frame interaction related to association establishment between a single-link AP and a single-link station, the multi-link MAC address may be carried in a probe request frame/a probe response frame, an authentication request frame/an authentication response frame, an association request frame/an association response frame, or a re-association request frame/a re-association response frame, thereby helping the STA multi-link device establish an association with the AP multi-link device. It should be noted that, when a station in the STA multi-link device sends one frame to an AP in the AP multi-link device, a receive address field in the frame is a MAC address of the AP in the AP multi-link device, not a MAC address (corresponding to a common multi-link MAC address owned by the AP multi-link device mentioned above) of the AP multi-link device, and a transmit address field is a MAC address of the station in the STA multi-link device, not a MAC address (corresponding to a common multi-link MAC address owned by the STA multi-link device mentioned above) of the STA multi-link device. The method for setting the address fields for communications in a reverse direction is similar, and details are not described herein again.

In a communications system with a multi-link device, there is no effective solution for managing a cache service of each station in the multi-link device. This application proposes a communications method, in which a listen interval in a multi-link device scenario is introduced to assist an AP multi-link device in managing a cache service of each STA in a STA multi-link device.

Figure 7:
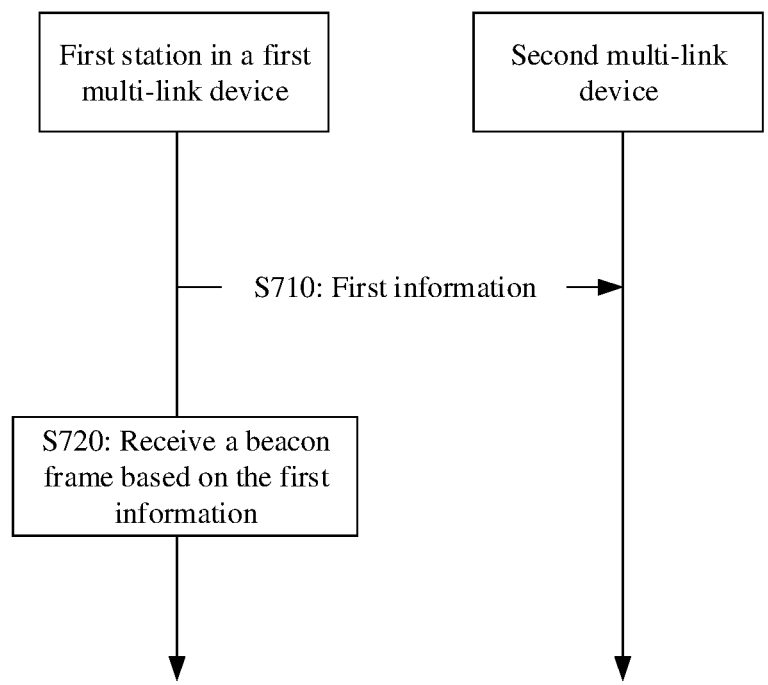
FIG. 7 is a schematic diagram of a communications method according to an embodiment of this application.
Figure 8:
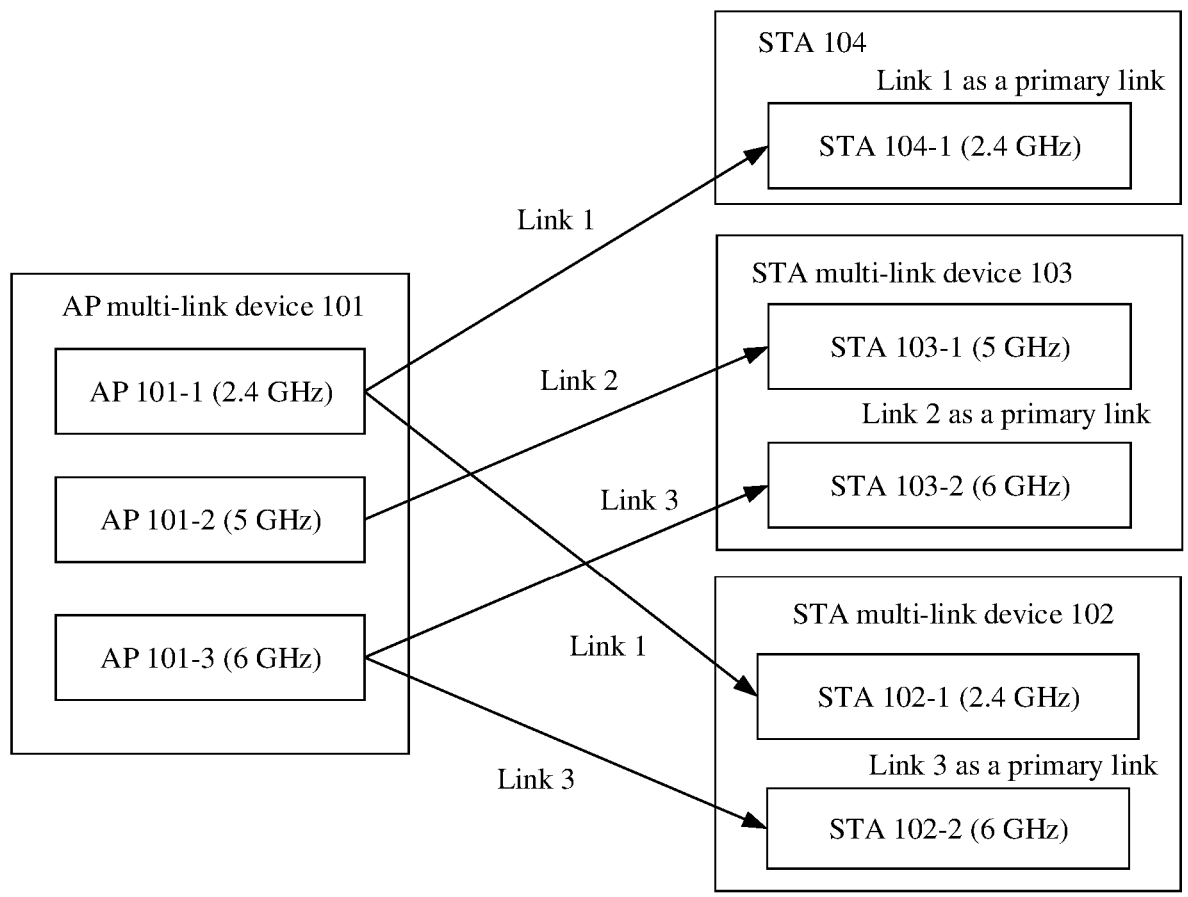
FIG. 8 is a schematic diagram of an example in which a communications method in this application is applied.
Figure 9:
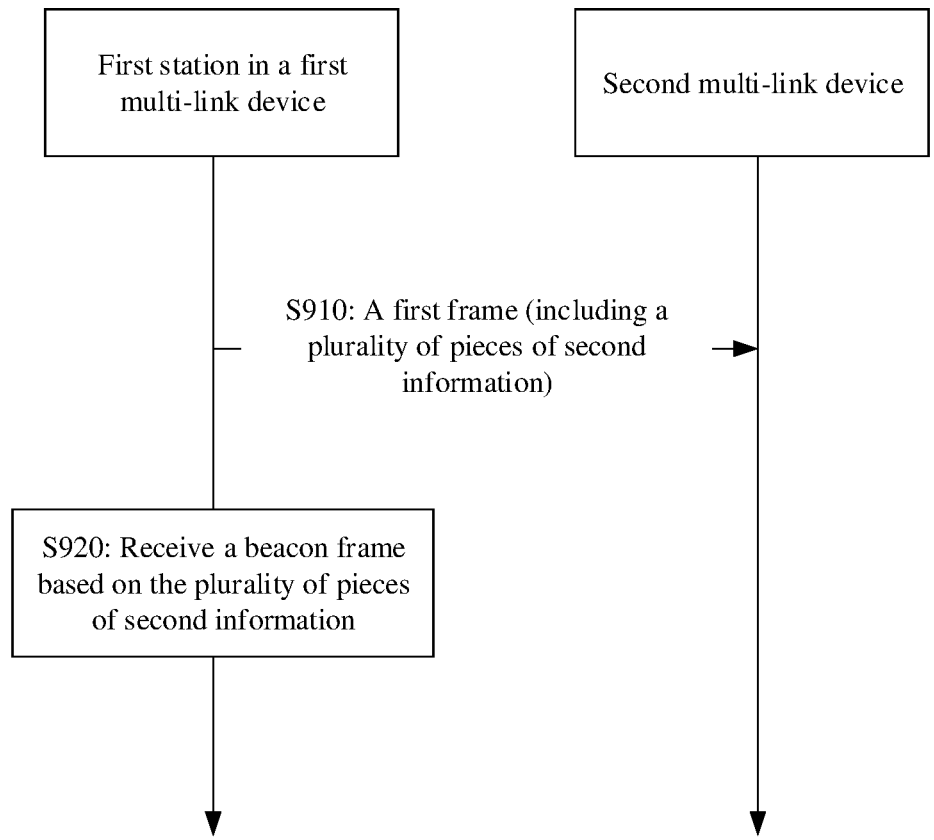
FIG. 9 is a schematic diagram of a communications method according to another embodiment of this application.

The following describes the communications method provided in this application with reference to FIG. 7 to FIG. 9.

FIG. 7 is a schematic diagram of a communications method 700 according to an embodiment of this application. As shown in FIG. 7, the method 700 includes the following steps.

S710: A first station in a first multi-link device sends first information to a second multi-link device, where the first information is used to indicate how often a station in the first multi-link device receives a beacon frame.

The first multi-link device includes one or more stations, where the first station is configured to establish an association request.

Optionally, the first information is used to indicate how often station in a power saving mode in the first multi-link device receives a beacon frame. For the power saving mode, refer to descriptions in a series protocol such as 802.11-2016.

The first multi-link device and the second multi-link device may be understood as two multi-link devices that perform data transmission in a communications system. One multi-link device in the two multi-link devices may be a STA multi-link device, and another multi-link device may be an AP multi-link device.

For example, the first multi-link device is a STA multi-link device, and the second multi-link device is an AP multi-link device. For ease of description, the following uses an example in which the first multi-link device is a STA multi-link device, and the second multi-link device is an AP multi-link device for description.

The first information is used to indicate, to the second multi-link device, how often a station in a power saving mode in the first multi-link device receives a beacon frame. In this embodiment of this application, "indication" may include "direct indication" or "indirect indication", or "implicit indication" or "explicit indication".

Optionally, the first multi-link device sends the first information through a first frame. Correspondingly, the second multi-link device receives the first frame, where the first frame carries the first information.

In other words, the first information may be carried in the first frame. For example, the first frame may be a management frame. For example, the management frame may be an association request frame or a re-association request frame. The association request frame is used to associate with a receiver (for example, the second multi-link device) of the association request frame.

The following briefly describes a multi-link device association process. An example in which the first multi-link device is a STA multi-link device, and the second multi-link device is an AP multi-link device is used for description. A STA in the STA multi-link device discovers surrounding APs by scanning, and then selects an appropriate AP for association. The AP belongs to the AP multi-link device. In a last phase of the association, the STA sends an association request frame to the AP, where the association request frame is used to associate with a receiver (for example, the AP) of the association request frame. Then, the AP replies with an acknowledge (ACK) frame. The AP returns an association response frame to the STA, where the association response frame is used to notify a receiver (for example, the STA) of the association response frame of a result of the association applied for and AP related information such as capability information of the AP, operation information, or the like. For specific explanations of the AP related information (for example, a capability element and an operation element), refer to descriptions in the series protocol such as 802.11-2016. If the association is successful, the AP assigns an association identifier (AID) to the station.

Optionally, the first information may use a newly added field, or may continue to use an existing field. This is not limited. If the first information continues to use the existing field, the existing field is re-defined. For example, a station in the multi-link device carries a listen interval field in an association request frame or a re-association request frame, and the first information may continue to use the listen interval field in the association request frame.

S720: The first multi-link device receives the beacon frame based on the first information.

In this embodiment of this application, the first multi-link device sends the first information, so that the second multi-link device may learn about, based on the first information, how often a station in the first multi-link device receives a beacon frame. Optionally, the station in the first multi-link device is in a power saving mode. The second multi-link device may send a beacon frame based on the first information. The first multi-link device obtains a downlink service indication through the beacon frame, learns about the downlink service indication, and then notifies the second multi-link device of an awake state through a power-saving poll frame, which helps the second multi-link device complete downlink service transmission. After obtaining the first information, the second multi-link device can effectively manage a cache service of each station in the first multi-link device with reference to the first information, thereby helping to manage a data buffer space.

In a possible implementation, if a value indicated by the first information carried by the station configured to establish the association request in the first multi-link device is too small (that is, the listen interval is relatively large), that is, the station in the first multi-link device receives the beacon frame is too infrequently low, the second multi-link device caches the service of the station in the first multi-link device for an excessively long time, which fully occupies a memory. In this case, the second multi-link device may reject the association request of the station. Specifically, a status code field carried in a returned association response frame is set to Denied (DENIED_LISTEN_INTERVAL_TOO_LARGE).

The first information in this embodiment of this application may be implemented in different manners. In different implementations, content represented by the first information is different.

Implementation 1: The first information indicates a first time interval within which a second station operating on a first link in the first multi-link device receives a beacon frame, and a unit of the first time interval is an interval of beacon frames on the first link.

In other words, the first time interval is related to an interval at which a third station operating on the first link in the second multi-link device sends the beacon frame.

In Implementation 1, the first link may be referred to as a primary link, and there is one first link. How to select the first link is not limited in this embodiment of this application. Optionally, the first link may be a link on which the STA multi-link device and the AP multi-link device complete an association request and association response interaction process. Optionally, the first link is selected by the STA multi-link device. A selection algorithm may be determined based on a busy degree of a channel. For example, a link whose traffic is not busy may be selected as the first link, to ensure that the STA multi-link device has sufficient time to be served on the link. An algorithm for selecting the first link is not specifically limited in this embodiment of this application. Optionally, the first link is specified by the AP multi-link device. For example, the AP may specify the first link for the STA multi-link device through a management frame.

For example, the primary link is based on a STA multi-link device, and primary links of different STA multi-link devices may be different. FIG. 8 is a schematic diagram of an example in which a communications method in this application is applied. For an operating frequency band of a multi-link device in FIG. 8, refer to the description in FIG. 6. Details are not described herein again. As shown in FIG. 8, a primary link of a STA multi-link device 102 may be link 3, a primary link of a STA multi-link device 103 may be link 2, and a primary link of a special multi-link device STA 104 may be link 1. The primary links shown in FIG. 8 are merely examples, and do not constitute a limitation on this embodiment of this application.

It may be understood that the example in FIG. 8 is merely for ease of understanding by a person skilled in the art on this embodiment of this application, and is not intended to limit this embodiment of this application to the specific scenario in the example. A person skilled in the art can definitely make various equivalent modifications or changes according to the example in FIG. 8, and such modifications or changes also fall within the scope of embodiments of this application.

Optionally, in Implementation 1, S720 includes: The first multi-link device receives the beacon frame on the first link at an interval of the first time interval.

For example, a STA multi-link device receives or listens for a beacon frame on a primary link to obtain BSS parameter information broadcast by the AP multi-link device, such as a traffic indication map (TIM) element or a multi-link TIM element, or a BSS parameter update indication. The TIM element or the multi-link TIM element is used to indicate downlink services of a plurality of stations in a plurality of multi-link devices, or downlink services of a plurality of single stations.

Implementation 2: The first information indicates a second time interval within which a plurality of stations operating on a plurality of links in the first multi-link device receive a beacon frame, and the second time interval is related to a plurality of beacon frame intervals at which the second multi-link device sends a beacon frame on the plurality of links, where each beacon frame interval is an interval at which a station in the second multi-link device sends a beacon frame on a link.

In an embodiment of Implementation 2, that the first information indicates the second time interval within which the plurality of stations operating on the plurality of links in the first multi-link device receive a beacon frame includes: The first information indicates a second time interval within which each station operating on each of the plurality of links in the first multi-link device receives a beacon frame, that is, a second time interval within which each station receives a beacon frame on a link on which the station operates.

Different from Implementation 1, there may be a plurality of primary links in Implementation 2, or it may be considered that there is no primary link in Implementation 2 and any link of the plurality of links may be used to listen for the BSS parameter information sent by the AP. Optionally, the plurality of primary links (or the plurality of links) are a plurality of links corresponding to a plurality of operating stations. The operating stations refer to a plurality of stations that participate in an association establishment process and are enabled (Enable).

For example, the second time interval is an interval at which a plurality of STAs operating on a plurality of links in the STA multi-link device wake up and receive a beacon frame. Optionally, the plurality of STAs operating on the plurality of links in the STA multi-link device are in the power saving mode. A unit of the second time interval may be related to a plurality of time intervals at which the second multi-link device sends a beacon frame on the plurality of links.

Optionally, the unit of the second time interval is a largest time interval in the plurality of beacon frame intervals at which the second multi-link device sends a beacon frame on the plurality of links, or a smallest time interval in the plurality of beacon frame intervals. In other words, the unit of the second time interval may be a smallest value or a largest value in the plurality of beacon frame intervals.

The beacon frame, the probe response frame, the association response frame, or another management frame carries a parameter of the beacon frame. For example, the parameter of the beacon frame includes a beacon frame interval, and a beacon frame interval of each link may be carried in a link information field corresponding to each link in a multi-link element. The multi-link element herein includes one or more of the following fields: a multi-link control field, a common field, and one or more link information fields. For details about these fields, see descriptions in the standard 802.11be Draft 0.4. When an AP in the AP multi-link device sends a beacon frame, the beacon frame, the probe response frame, the association response frame, or the another management frame further carries a parameter of a beacon frame sent by one or more other APs in the same multi-link device, for example, a beacon frame interval. Optionally, the one or more other APs may be a primary-link AP candidate set indicated by the AP multi-link device. The STA multi-link device may select one or more links from the primary-link AP candidate set as primary links.

Optionally, in Implementation 2, S720 includes: The first multi-link device receives the beacon frame on at least one of the plurality of links at an interval of the second time interval.

Alternatively, a plurality of stations (namely, all stations operating on a plurality of links) in the first multi-link device may receive the beacon frame on each of the plurality of links, namely, all of the plurality of links, at an interval of the second time interval. Alternatively, some stations (namely, stations operating on some of a plurality of links) in the first multi-link device may receive the beacon frame on some of the plurality of links at an interval of the second time interval.

In this embodiment of this application, if a value of the listen interval (for example, the first time interval or the second time interval) is 0, any station in the STA multi-link device does not enter a sleep mode, that is, the station is always in an awake state. In this embodiment of this application, if the first information continues to use the listen interval field, the listen interval field is of two bytes, and a beacon frame period is used as a basic unit. For the AP multi-link device, the AP multi-link device manages, by using a listen interval field carried in an association request frame sent by a STA in the STA multi-link device, a lifetime of a cache service of the STA multi-link device. The AP multi-link device may further determine the lifetime of the cache service of the STA multi-link device.

In this embodiment of this application, a STA in the power saving mode in the STA multi-link device periodically wakes up and receives the beacon frame based on the listen interval parameter and a ReceiveDTIMs parameter. The beacon frame includes a special class of DTIM beacon frames that are also periodically broadcast by the AP. A DTIM beacon frame interval is an integer multiple of the beacon frame interval. If ReceiveDTIMs is true, the STA wakes up and receives all DTIM beacon frames. If ReceiveDTIMs is false, the STA is not required to wake up to receive each DTIM beacon frame. The STA obtains, by receiving the beacon frame, important BSS parameter information broadcast by the AP, for example, a TIM. The TIM is used to indicate whether the AP has a downlink service to a plurality of stations. If a waked-up STA detects that the TIM element in the beacon frame sent by the AP includes an indication that the AP has a downlink data service to the STA, the STA sends a power-saving poll (PS-poll) frame to the AP, to notify the AP that the STA is in an awake state. In this case, the AP may send the downlink data service to the STA. The STA in the power saving mode needs to wake up early enough so that time of receiving a first beacon frame falls within a listen interval starting with transmission time of the previous beacon frame. The STA learns about the downlink service indication by receiving the beacon frame, and then notifies the AP that the STA is in an awake state through the power-saving poll frame, to help the AP complete downlink service transmission.

The second multi-link device sends the beacon frame based on the first information. For the second multi-link device, after obtaining the first information, the second multi-link device may manage the cache service of the first multi-link device based on the first information, to implement effective management of the downlink cache service of the multi-link device.

Optionally, after obtaining the first information, the second multi-link device may further determine a lifetime of the cache service of the first multi-link device based on the first information.

Optionally, when time that the second multi-link device caches the service of the first multi-link device is less than time indicated by the first information, the second multi-link device skips discarding the cache service of the first multi-link device. Optionally, when the time that the second multi-link device caches the service of the first multi-link device is greater than or equal to the time indicated by the first information, the second multi-link device discards the cache service of the first multi-link device. In another manner, optionally, when the time that the second multi-link device caches the service of the first multi-link device is greater than the time indicated by the first information, the second multi-link device discards the cache service of the first multi-link device.

It may be understood that the foregoing condition for determining whether to discard the cache service is merely an example, and does not constitute a limitation on this embodiment of this application.

Herein, the time indicated by the first information is an overview of the listen interval determined in embodiments of this application (for example, for a method for determining the listen interval, refer to the foregoing Implementation 1 or Implementation 2 shown in FIG. 7, and specific details are not described again; or the listen interval determined in the following method 900).

It may be further understood that a case in which "the time for caching the service is equal to the time indicated by the first information" and a case in which "the time for caching the service is greater than the time indicated by the first information" are classified into one category for description, but this does not constitute a limitation on this embodiment of this application. Actually, the case in which "the time for caching the service is equal to the time indicated by the first information" and the case in which "the time for caching the service is less than the time indicated by the first information" may alternatively be classified as one category. In other words, "when the time that the second multi-link device caches the service of the first multi-link device is less than or equal to the time indicated by the first information, the second multi-link device skips discarding the cache service of the first multi-link device."

For example, the AP multi-link device uses an age function to determine whether to discard the cache service. The age function may be determined based on the first information. For example, the age function is determined based on a listen interval parameter (for example, a first time interval or a second time interval) carried in an association request frame or a re-association request frame by a STA in the STA multi-link device. The AP may determine, based on the first time interval or the second time interval, a lifetime for caching a data service of each STA in the STA multi-link device, thereby facilitating data buffer space management.

This application further provides another communications method. A first frame carries a plurality of pieces of second information, so that a second multi-link device effectively manages a cache service of each station in a first multi-link device.

FIG. 9 is a schematic flowchart of a communications method 900 according to another embodiment of this application. As shown in FIG. 9, the method 900 includes the following steps.

S910: A first station in a first multi-link device sends a first frame to a second multi-link device, where the first frame includes a plurality of pieces of second information, and each of the plurality of pieces of second information is used to indicate how often a station in a power saving mode in the first multi-link device receives a beacon frame. Correspondingly, the second multi-link device receives the first frame. Specifically, the second multi-link device receives the first frame on a link on which the first station operates.

In an implementation, the plurality of pieces of second information are used to indicate respective frequencies at which a plurality of stations in the first multi-link device receive beacon frames.

For related descriptions of the first frame, refer to the foregoing descriptions. Details are not described herein again. For related descriptions of the first station, refer to the foregoing descriptions. Details are not described herein again. For related descriptions of the first multi-link device and the second multi-link device, refer to the foregoing descriptions. Details are not described herein again.

Herein, a quantity of the plurality of pieces of second information is the same as a quantity of the plurality of stations in the first multi-link device.

Optionally, the second information may use a newly added field, or may continue to use an existing field. This is not limited. In one manner, the second information continues to use the existing field, and the existing field is redefined. For example, a station in the multi-link device carries a listen interval field in an association request frame or a re-association request frame, and the second information may continue to use the listen interval field in the association request frame or the re-association request frame. The listen interval is used to indicate how often the first station in a power saving mode receives a beacon frame, and the listen interval is in a unit of an interval of beacon frames on the link on which the first station operates. For example, the first station may further carry a plurality of listen interval fields in the association request frame, to notify the second multi-link device of respective frequencies at which a plurality of stations in the power saving mode other than the first station in the first multi-link device receive beacon frames. The plurality of listen interval fields are in units of intervals of beacon frames on links on which the plurality of stations in the power saving mode other than the first station in the first multi-link device operate. Optionally, the association request frame or the re-association request frame further includes a field for indicating a quantity of listen intervals or link identifiers. In another manner, the second information may use the newly added field, and the first station may carry a plurality of listen interval fields in the association request frame or the re-association request frame, to notify the second multi-link device of respective frequencies at which a plurality of stations in the power saving mode in the first multi-link device receive beacon frames. The plurality of listen interval fields are in units of intervals of beacon frames on links on which the plurality of stations in the power saving mode other than the first station in the first multi-link device operate. Optionally, the association request frame or the re-association request frame further includes a field for indicating a quantity of listen intervals or link identifiers. The foregoing description is described by using the station(s) in the power saving mode as an example. Optionally, the station(s) in the power saving mode may be directly referred to as the station(s). This is not specifically limited.

Optionally, the first frame further includes link identifiers of a plurality of stations, where each link identifier corresponds to one piece of second information, and the link identifier is used to identify a station in the first multi-link device. The link identifier may identify (or represent) a station that operates on one link in the first multi-link device, or may identify (or represent) a link on which the station operates. Optionally, before the communication, the first multi-link device and the second multi-link device may first negotiate or communicate with each other about a correspondence between a link identifier and a link or a station on a link, or the AP multi-link device indicates a correspondence between a link identifier and a link or a station on a link through a broadcast management frame (for example, a beacon frame). Herein, a large amount of signaling information does not need to be transmitted to indicate a link or a station on a link, and the link identifier may be carried, thereby reducing signaling overheads and improving transmission efficiency. For descriptions of the link identifier, refer to the foregoing descriptions. Details are not described herein again.

S920: The first multi-link device receives a beacon frame based on the plurality of pieces of second information.

In this embodiment of this application, the first multi-link device sends a plurality of pieces of second information (a plurality of listen intervals) to the second multi-link device, so that the second multi-link device effectively manages a cache service of each station in the STA multi-link device.

Herein, a manner in which the second multi-link device manages the cache service is similar to that described above. For example, the AP multi-link device determines, based on an age function, whether to discard the cache service in the STA multi-link device. The age function is determined by the plurality of listen interval fields.

Figure 10:
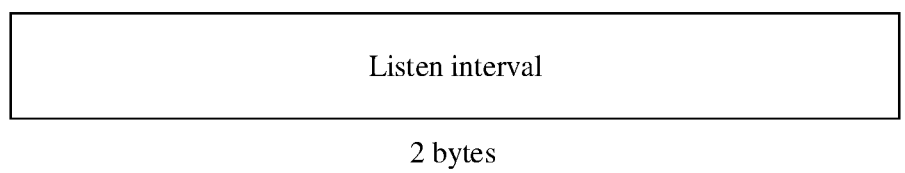
FIG. 10 is an example diagram of a listen interval.

It may be understood that, in embodiments of this application, a quantity of bytes of a field length of the listen interval is not fixedly limited. For example, a length of one or more listen intervals in this embodiment of this application may be two bytes, or may be bytes of other lengths, for example, 3, 4, or 5 bytes. FIG. 10 shows a schematic diagram of a listen interval field. As shown in FIG. 10, a listen interval occupies two bytes.

Figure 11:
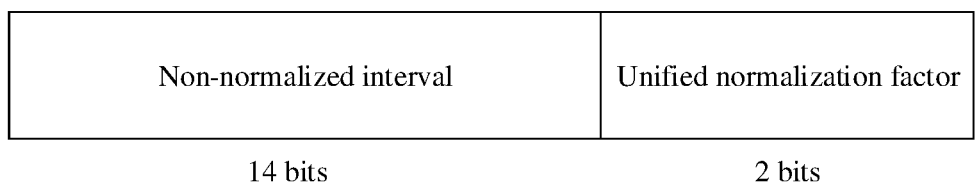
FIG. 11 is another example diagram of a listen interval.

The listen interval supports listen duration with a length of a maximum of $(2^{16}-1)$ unit intervals. The unit interval is a beacon frame interval of beacon frames on the link on which the first station operates (Implementation 1 shown in FIG. 7 above), or a largest value or a smallest value in the plurality of beacon frame intervals of beacon frames on the plurality of links (Implementation 2 shown in FIG. 7 above). Alternatively, the unit interval is a beacon frame interval of beacon frames on one link corresponding to the unit interval length of each of the plurality of listen intervals (a manner shown in FIG. 9 above). To support longer sleep time, this application proposes to re-define the listen interval. As shown in FIG. 11, the listen interval includes a 14-bit non-normalized interval and a 2-bit unified normalization factor.

Duration of the listen interval is Non-normalized interval*Normalization factor*Unit interval length, where "*" represents a multiplication operation, and values of the normalization factor are shown in Table 1.

TABLE 1

| Unified normalization factor | Normalization factor |
| --- | --- |
| 0 | 1 |
| 1 | 10 |
| 2 | 1000 |
| 3 | 10000 |

In Table 1, normalization factors corresponding to different unified normalization factors have different values.

The unit of the listen interval mentioned in this embodiment of this application is related to the beacon frame interval (in a unit of a beacon frame interval, or in a unit of a largest value or a smallest value in the plurality of beacon frame intervals), but is not limited thereto. The unit of the listen interval mentioned in this embodiment of this application may also be related to a transmission interval of other specified broadcast management frames. For example, the listen interval mentioned in this embodiment of this application is in a unit of a transmission interval of management frames broadcast on the primary link, in a unit of a largest value or a smallest value in a plurality of transmission intervals of management frames broadcast on a plurality of links, or in a unit of a transmission interval of management frames broadcast on a link identified by a link identifier field.

A meaning of the listen interval mentioned in this embodiment of this application is to indicate how often a station in the power saving mode in a STA multi-link device receives a beacon frame, but is not limited thereto. The listen interval mentioned in this embodiment of this application further includes another meaning. For a station in a special power saving mode, for example, a non-traffic indication map (Non-traffic indication map, Non-TIM) mode, in the STA multi-link device, the station does not need to periodically wake up to receive a beacon frame. In this case, the listen interval is used to indicate an interval at which the station in the STA multi-link sends at least one frame to an associated AP. The frame may be used to notify the associated AP multi-link device that the station in the STA multi-link device is in an awake state (the frame is similar to a PS-poll frame), so that the associated AP multi-link device may send a downlink service to the STA multi-link device. Herein, there may be one listen interval, which is applied to a STA multi-link device. For a specific method of the one listen interval, refer to Implementation 1 or Implementation 2 shown in FIG. 7 above. Details are not described again. Herein, there may be a plurality of listen intervals, which are applied to a plurality of stations in the STA multi-link device. For a specific method of the plurality of listen intervals, refer to the implementation shown in FIG. 9 above. Details are not described again.

The method mentioned in this embodiment of this application is further applicable for the AP multi-link device to manage a cache service of a station in a wireless network management (WNM) sleep mode in the STA multi-link device. The station in the WNM sleep mode does not need to periodically wake up to receive each DTIM beacon frame. The following describes a specific manner in which the AP multi-link device manages the cache service of the station in the WNM sleep mode. In the following manner, a WNM sleep interval field may be similar to the listen interval field in the foregoing description, that is, the foregoing embodiment of the listen interval field is also applicable to the WNM sleep interval field.

Manner 1: One or more stations in the STA multi-link device respectively interact with one or more APs in the AP multi-link device through a WNM sleep request frame and a WNM sleep response frame, so that one or more stations in the STA multi-link device separately enter the WNM sleep mode.

Figures 12, 13:
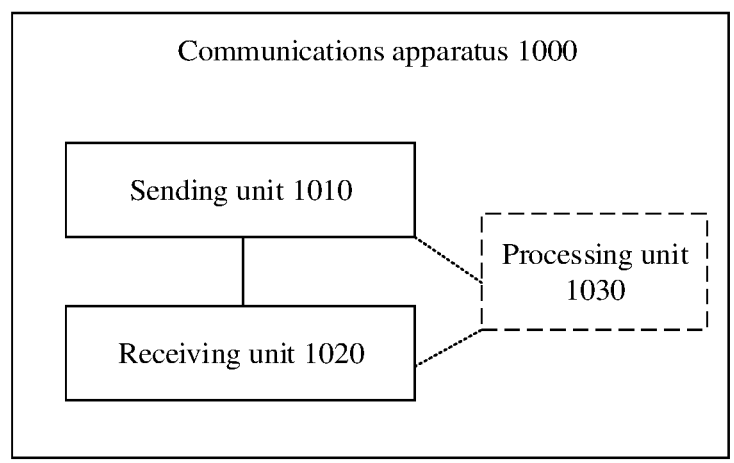
FIG. 12 is an example diagram of a WNM sleep mode element.
FIG. 13 is a schematic block diagram of a communications apparatus according to an embodiment of this application.

Specifically, a station in the STA multi-link device sends a WNM sleep request frame to an AP in the AP multi-link device, where the WNM sleep request frame carries a WNM sleep mode element, and the WNM sleep mode element includes element ID field, length field, action type field, WNM sleep mode response status field, and WNM sleep interval field. FIG. 12 shows an example diagram of a WNM sleep mode element. As shown in FIG. 12, the WNM sleep mode element includes element ID field, length field, action type field, WNM sleep mode response status field, and WNM sleep interval field. The WNM sleep interval field in the WNM sleep mode element is used to indicate an interval at which a station in the WNM sleep state in the STA multi-link device receives a beacon frame, and a unit of the WNM sleep interval is a DTIM beacon frame interval. A WNM sleep interval field with value 0 indicates that the station in the WNM sleep state in the STA multi-link device does not wake up at any specified interval.

Manner 2: One station in the STA multi-link device interacts with one AP in the AP multi-link device through a WNM sleep request frame and a WNM sleep response frame, so that some or all stations in the STA multi-link device enter the WNM sleep mode.

Specifically, a station in the STA multi-link device sends a WNM sleep request frame to an AP in the AP multi-link device, where the WNM sleep request frame carries a WNM sleep mode element, and the WNM sleep mode element includes element ID field, length field, action type field, WNM sleep mode response status field, and WNM sleep interval field. For the WNM sleep mode element, refer to FIG. 12. The WNM sleep interval field is used to indicate an interval at which a station in the WNM sleep state in the STA multi-link device receives a beacon frame, and a unit of the WNM sleep interval is a DTIM beacon frame interval. A WNM sleep interval field with value 0 indicates that the station in the WNM sleep state in the STA multi-link device does not wake up at any specified interval.

In Manner 2, there may be one WNM sleep interval, which is applied to a STA multi-link device. A specific method is similar to Implementation 1 or Implementation 2 shown in FIG. 7 above, except that the listen interval is replaced with the WNM sleep interval, and that the unit of the listen interval is related to the beacon frame interval is replaced with that the unit of the WNM sleep interval is related to the DTIM beacon frame interval. Other specific details are not described here.

In Manner 2, there may be a plurality of WNM sleep intervals, which are applied to a plurality of stations in the station multi-link device. A specific method is similar to the implementation shown in FIG. 9, except that the listen interval is replaced with the WNM sleep interval, and that the unit of the listen interval is related to the beacon frame interval is replaced with that the unit of the WNM sleep interval is related to the DTIM beacon frame interval. For example, the WNM sleep interval is in a unit of a DTIM beacon frame interval on the primary link, in a unit of a largest value or a smallest value in a plurality of DTIM beacon frame intervals on a plurality of links, or in a unit of an interval of DTIM beacon frames on a link identified by a link identifier field. Other specific details are not described herein, for example, the WNM sleep element includes a plurality of WNM sleep intervals and a plurality of link identifiers, and each WNM sleep interval corresponds to one link identifier, which is used to indicate a WNM sleep interval of a station corresponding to the link identifier. Optionally, the WNM sleep element further includes a field for indicating a quantity of WNM sleep interval fields or link identifier fields. Optionally, "Multi-link device enters WNM sleep mode" and "Multi-link device exits WNM sleep mode" are added to the action type, to distinguish from the existing "Enter WNM sleep mode" and "Exit WNM sleep mode".

It may be understood that, in some scenarios, some optional features in embodiments of this application may be independently implemented without depending on another feature, for example, a solution on which the optional features are currently based, to resolve a corresponding technical problem and achieve a corresponding effect. Alternatively, in some scenarios, the optional features are combined with other features based on requirements. Correspondingly, an apparatus provided in embodiments of this application may also correspondingly implement these features or functions. Details are not described herein.

It should be further understood that the solutions in embodiments of this application may be appropriately combined for use, and explanations or descriptions of terms in embodiments may be mutually referenced or explained in embodiments. This is not limited.

It should further be understood that sequence numbers of the foregoing processes do not mean execution sequences in various embodiments of this application. The execution sequences of the processes should be determined based on functions and internal logic of the processes. Numbers or sequence numbers in the foregoing processes are merely used for differentiation for ease of description, and should not constitute any limitation on an implementation process of embodiments of this application.

Corresponding to the methods provided in the foregoing method embodiments, an embodiment of this application further provides a corresponding apparatus. The apparatus includes a corresponding module configured to perform the foregoing embodiments. The module may be software, hardware, or a combination of software and hardware. It may be understood that the technical features described in the method embodiments are also applicable to the following apparatus embodiments.

FIG. 13 is a schematic block diagram of a communications apparatus 1000 according to an embodiment of this application. As shown in FIG. 13, the communications apparatus includes a sending unit 1010. Optionally, the communications apparatus may further include a receiving unit 1020 and a processing unit 1030.

In a possible design, the communications apparatus 1000 may correspond to the first multi-link device in the foregoing method embodiments, for example, may be an MLD, or a chip disposed in the MLD.

In an embodiment, the sending unit 1010 is configured to send first information to the second multi-link device, where the first information is used to indicate how often a station in the power saving mode in the first multi-link device receives a beacon frame. The receiving unit 1020 is configured to receive the beacon frame based on the first information.

Optionally, a first station is a station that is in the first multi-link device and that is used to establish an association request.

In a possible implementation, the first information indicates a first time interval at which a second station operating on a first link in the first multi-link device receives a beacon frame, and a unit of the first time interval is an interval of beacon frames on the first link.

Optionally, the first station is the same as or different from the second station.

Optionally, that the receiving unit 1020 is configured to receive the beacon frame based on the first information includes: receiving the beacon frame on the first link at an interval of the first time interval.

In another possible implementation, the first information indicates a second time interval at which a plurality of stations operating on a plurality of links in the first multi-link device receive a beacon frame, and the second time interval is related to a plurality of beacon frame intervals at which the second multi-link device sends a beacon frame on the plurality of links, where each beacon frame interval is an interval at which a station in the second multi-link device sends a beacon frame on a link.

Optionally, the unit of the second time interval is a largest time interval in the plurality of beacon frame intervals at which the second multi-link device sends a beacon frame on the plurality of links, or a smallest time interval in the plurality of beacon frame intervals.

Optionally, that the receiving unit 1020 receives the beacon frame based on the first information includes: receiving the beacon frame on at least one of the plurality of links at an interval of the second time interval.

That the sending unit 1010 is configured to send first information to the second multi-link device includes: sending a first frame to the second multi-link device, where the first frame carries the first information. The first frame may be a management frame, for example, the first frame is an association request frame or a re-association request frame.

Alternatively, in another embodiment, the sending unit 1010 is configured to send a first frame to the second multi-link device, where the first frame includes a plurality of pieces of second information, and each of the plurality of pieces of second information is used to indicate how often a station in the power saving mode in the first multi-link device receives a beacon frame. The receiving unit 1020 is configured to receive a beacon frame based on the plurality of pieces of second information.

Optionally, the first frame further includes link identifiers of a plurality of stations, each link identifier corresponds to one piece of second information, and the link identifier is used to identify a station in the first multi-link device.

The first frame may be a management frame, for example, the first frame is an association request frame or a re-association request frame.

Specifically, the communications apparatus 1000 may correspond to the first multi-link device in the method 700 or the method 900 in the embodiments of this application, and the communications apparatus 1000 may include a unit configured to perform the method performed by the first multi-link device in the method 700 in FIG. 7 or the method 900 in FIG. 9. In addition, each unit in the communications apparatus 1000 and the foregoing other operations or functions are respectively used to implement corresponding procedures of the first multi-link device in the method 700 in FIG. 7 or the method 900 in FIG. 9.

Figure 14:
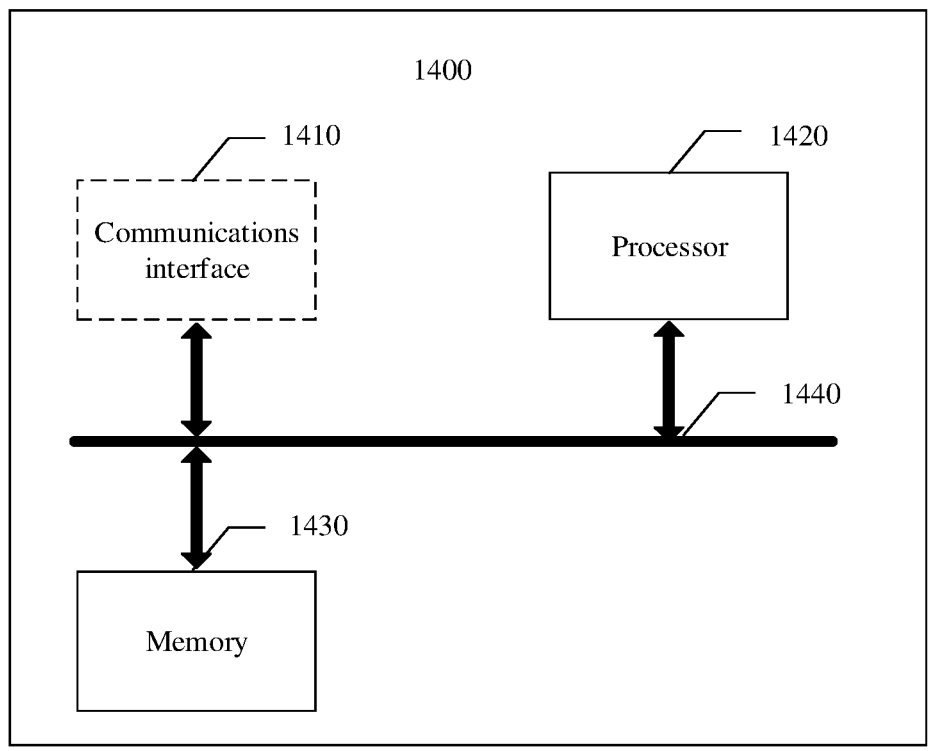
FIG. 14 is a schematic diagram of a structure of a communications apparatus according to an embodiment of this application.

It should be further understood that when the communications apparatus 1000 is a communications apparatus shown in FIG. 14, the sending unit 1010 in the communications apparatus 1000 may correspond to a communications interface shown in FIG. 14, the receiving unit 1020 may correspond to the communications interface shown in FIG. 14, and the processing unit 1030 in the communications apparatus 1000 may correspond to a processor shown in FIG. 14.

In an embodiment, the receiving unit 1020 is configured to receive first information from the first multi-link device, where the first information is used to indicate how often a station in the power saving mode in the first multi-link device receives a beacon frame. The sending unit 1010 is configured to send the beacon frame based on the first information.

Optionally, the processing unit 1030 is configured to determine, based on the first information, a lifetime of a service of the first multi-link device.

Optionally, the processing unit 1030 is further configured to: when time that the second multi-link device caches the service of the first multi-link device is less than time indicated by the first information, skip discarding the cache service of the first multi-link device.

Optionally, the processing unit 1030 is further configured to: when the time that the second multi-link device caches the service of the first multi-link device is greater than time indicated by the first information, discard the cache service of the first multi-link device.

Optionally, that the receiving unit 1020 is configured to receive first information from the first multi-link device includes: receiving a first frame from the first multi-link device, where the first frame carries the first information. The first frame may be a management frame, for example, the first frame is an association request frame or a re-association request frame.

Alternatively, in another embodiment, the receiving unit 1020 is configured for the second multi-link device to receive a first frame, where the first frame includes a plurality of pieces of second information, and each of the plurality of pieces of second information is used to indicate how often a station in the power saving mode in the first multi-link device receives a beacon frame. Then, the second multi-link device sends a beacon frame based on the plurality of pieces of second information.

Optionally, the first frame further includes link identifiers of a plurality of stations, each link identifier corresponds to one piece of second information, and the link identifier is used to identify a station in the first multi-link device. The first frame may be a management frame, for example, the first frame is an association request frame or a re-association request frame.

It should be understood that, a specific process in which each unit performs the foregoing corresponding step has been described in detail in the foregoing method embodiments. For brevity, details are not described herein again.

Figure 15:
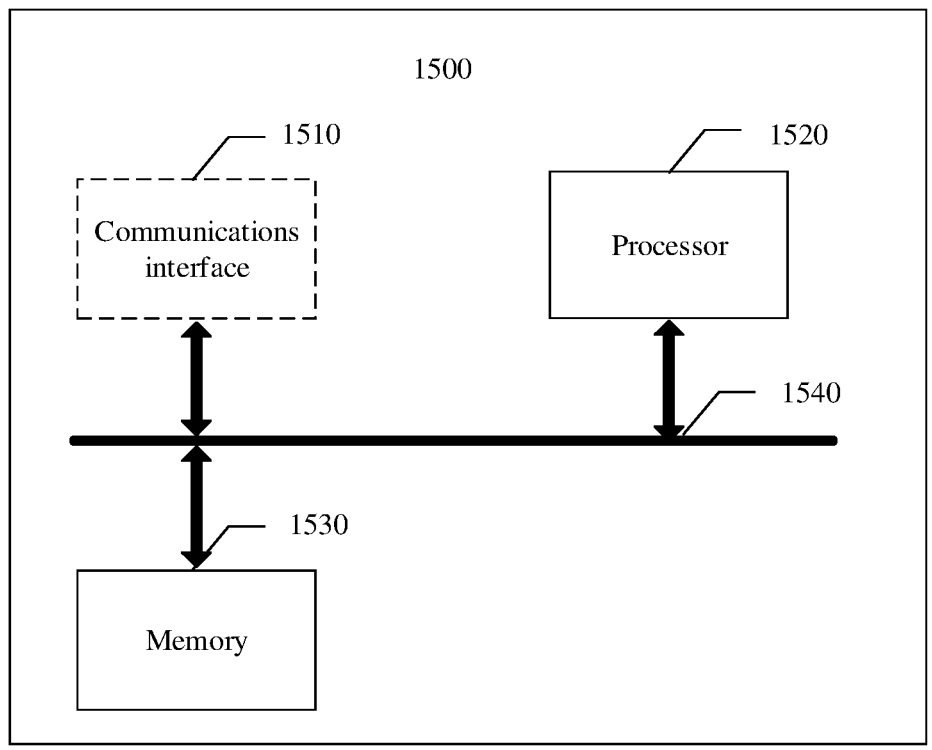
FIG. 15 is a schematic diagram of a structure of a communications apparatus according to an embodiment of this application.

It should be further understood that when the communications apparatus 1000 is a communications apparatus shown in FIG. 15, the sending unit 1010 in the communications apparatus 1000 may correspond to a communications interface shown in FIG. 15, the receiving unit 1020 may correspond to the communications interface shown in FIG. 15, and the processing unit 1030 in the communications apparatus 1000 may correspond to a processor shown in FIG. 15.

Optionally, the communications apparatus 1000 further includes a storage unit. The storage unit may be configured to store instructions or data. The processing unit may invoke the instructions or data stored in the storage unit, to implement a corresponding operation. The storage unit may be implemented via at least one memory. For example, the storage unit may correspond to a memory in FIG. 15.

It should be further understood that when the communications apparatus 1000 is a chip disposed in an MLD, the sending unit 1010 in the communications apparatus 1000 may be an output interface circuit, and the receiving unit 1020 may be an input interface circuit.

Division into modules in embodiments of this application is an example, is merely logical function division, and there may be other division during actual implementation. In addition, functional modules in embodiments of this application may be integrated into one processor, or each of the modules may exist alone physically, or two or more modules may be integrated into one module. The integrated module may be implemented in a form of hardware, or may be implemented in a form of a software functional module.

FIG. 14 is a schematic diagram of a structure of a communications apparatus 1400 according to an embodiment of this application. The communications apparatus 1400 is configured to implement functions of the first multi-link device in the foregoing methods. The apparatus may be the first multi-link device, or may be an apparatus that can be used in matching with the first multi-link device. For example, the apparatus may be installed in the first multi-link device. The apparatus may be a chip system. In embodiments of this application, the chip system may include a chip, or may include a chip and another discrete component. The apparatus 1400 includes at least one processor 1420, configured to implement functions of the first multi-link device in the methods provided in embodiments of this application.

For example, the processor 1420 may send first information to the second multi-link device through a communications interface, where the first information is used to indicate how often a station in the power saving mode in the first multi-link device receives a beacon frame; and receive a beacon frame through the communications interface.

For example, the processor 1420 may send a first frame to the second multi-link device through the communications interface, where the first frame includes a plurality of pieces of second information, and each piece of second information is used to indicate how often a station in the power saving mode in the first multi-link device receives a beacon frame; and receive a beacon frame through the communications interface.

The apparatus 1400 may further include at least one memory 1430, configured to store program instructions and/or data. The memory 1430 is coupled to the processor 1420. The coupling in embodiments of this application is indirect coupling or a communications connection between apparatuses, units, or modules for information exchange between the apparatuses, the units, or the modules, and may be in electrical, mechanical, or other forms. The processor 1420 may operate in collaboration with the memory 1430. The processor 1420 may execute the program instructions stored in the memory 1430. At least one of the at least one memory may be included in the processor.

The apparatus 1400 may further include a communications interface 1410, configured to communicate with another device through a transmission medium, so that an apparatus in the apparatus 1400 can communicate with the another device. In this embodiment of this application, the communications interface may be a transceiver, an interface, a bus, a circuit, a pin, or an apparatus that can implement a transceiver function. For example, the another device may be the second multi-link device. The processor 1420 sends and receives data through the communications interface 1410, and is configured to implement the method performed by the first multi-link device in the embodiment corresponding to FIG. 7 or FIG. 9.

In this embodiment of this application, a specific connection medium between the communications interface 1410, the processor 1420, and the memory 1430 is not limited. In this embodiment of this application, in FIG. 14, the memory 1430, the processor 1420, and the communications interface 1410 are connected through a bus 1440. The bus is represented by a thick line in FIG. 14. A connection manner between other components is merely an example for description, and is not limited thereto. The bus may be classified into an address bus, a data bus, a control bus, and the like. For ease of representation, only one thick line is used to represent the bus in FIG. 14, but this does not mean that there is only one bus or only one type of bus.

It should be understood that the communications apparatus shown in FIG. 14 can implement the method performed by the first multi-link device in this embodiment of this application, for example, processes related to the first multi-link device in the method embodiment shown in FIG. 7 or FIG. 9. Operations and/or functions of modules in the communications apparatus are respectively used to implement corresponding procedures in the foregoing method embodiments. For details, refer to the descriptions in the foregoing method embodiments. To avoid repetition, detailed descriptions are properly omitted herein.

It should be understood that the communications apparatus shown in FIG. 14 is merely a possible architecture of the first multi-link device, and should not constitute any limitation on this application.

FIG. 15 is a schematic diagram of a structure of a communications apparatus 1500 according to an embodiment of this application. The communications apparatus 1500 is configured to implement functions of the second multi-link device in the foregoing methods. The apparatus may be the second multi-link device, or may be an apparatus that can be used in matching with the second multi-link device. For example, the apparatus may be installed in the second multi-link device. The apparatus may be a chip system. In embodiments of this application, the chip system may include a chip, or may include a chip and another discrete component. The apparatus 1500 includes at least one processor 1520, configured to implement functions of the second multi-link device in the methods provided in embodiments of this application.

For example, the processor 1520 may receive first information from the first multi-link device through a communications interface, where the first information is used to indicate how often a station in the power saving mode in the first multi-link device receives a beacon frame; and send the beacon frame.

For example, the processor 1520 may receive a first frame through the communications interface, where the first frame includes a plurality of pieces of second information, and each piece of second information is used to indicate how often a station in the power saving mode in the first multi-link device receives a beacon frame; and send the beacon frame.

The apparatus 1500 may further include at least one memory 1530, configured to store program instructions and/or data. The memory 1530 is coupled to the processor 1520. The coupling in embodiments of this application is indirect coupling or a communications connection between apparatuses, units, or modules for information exchange between the apparatuses, the units, or the modules, and may be in electrical, mechanical, or other forms. The processor

1520 may operate in collaboration with the memory 1530. The processor 1520 may execute the program instructions stored in the memory 1530. At least one of the at least one memory may be included in the processor.

The apparatus 1500 may further include a communications interface 1510, configured to communicate with another device through a transmission medium, so that an apparatus in the apparatus 1500 can communicate with the another device. In this embodiment of this application, the communications interface may be a transceiver, an interface, a bus, a circuit, a pin, or an apparatus that can implement a transceiver function. For example, the another device may be the second multi-link device. The processor 1520 sends and receives data through the communications interface 1510, and is configured to implement the method performed by the second multi-link device in the embodiment corresponding to FIG. 7 or FIG. 9.

In this embodiment of this application, a specific connection medium between the communications interface 1510, the processor 1520, and the memory 1530 is not limited. In this embodiment of this application, in FIG. 15, the memory 1530, the processor 1520, and the communications interface 1510 are connected through a bus 1540. The bus is represented by a thick line in FIG. 15. A connection manner between other components is merely described as an example, and is not limited thereto. The bus may be classified into an address bus, a data bus, a control bus, and the like. For ease of representation, only one thick line is used to represent the bus in FIG. 15, but this does not mean that there is only one bus or only one type of bus.

It should be understood that the communications apparatus shown in FIG. 15 can implement the method performed by the second multi-link device in this embodiment of this application, for example, processes related to the second multi-link device in the method embodiment shown in FIG. 7 or FIG. 9. Operations and/or functions of modules in the communications apparatus are respectively used to implement corresponding procedures in the foregoing method embodiments. For details, refer to the descriptions in the foregoing method embodiments. To avoid repetition, detailed descriptions are properly omitted herein.

It should be understood that the communications apparatus shown in FIG. 15 is merely a possible architecture of the second multi-link device, and should not constitute any limitation on this application.

Optionally, the communications apparatus in this embodiment of this application includes but is not limited to an AP device such as a communications server, a router, a switch, or a network bridge, and a non-AP device such as a mobile phone, a tablet computer, a notebook computer, a smart watch, or a smart TV.

According to the methods provided in embodiments of this application, this application further provides a computer program product. The computer program product includes computer program code. When the computer program code is run on a computer, the computer is enabled to perform the method in the embodiment shown in FIG. 7 or FIG. 9. According to the methods provided in embodiments of this application, this application further provides a computer-readable medium.

According to the methods provided in embodiments of this application, this application further provides a computer-readable medium. The computer-readable medium stores program code. When the program code is run on a computer, the computer is enabled to perform the method in the embodiment shown in FIG. 7 or FIG. 9.

An embodiment of this application further provides a processing apparatus, including a processor and an interface. The processor is configured to perform the communications method in any one of the foregoing method embodiments.

A person skilled in the art may further understand that various illustrative logical blocks and steps that are listed in embodiments of this application may be implemented by using electronic hardware, computer software, or a combination thereof. Whether the functions are implemented by using hardware or software depends on particular applications and a design requirement of the entire system. A person skilled in the art may use various methods to implement the described functions for each particular application, but it should not be considered that the implementation goes beyond the scope of embodiments of this application.

It should be understood that the processor in embodiments of this application may be an integrated circuit chip, and has a signal processing capability. In an implementation process, the steps in the foregoing method embodiments may be completed by using a hardware integrated logic circuit in a processor or instructions in a form of software. The processor may be a general purpose processor, a digital signal processor (DSP), an application-specific integrated circuit (application specific integrated circuit, ASIC), a field programmable gate array (FPGA) or another programmable logic device, a discrete gate, a transistor logic device, a discrete hardware component, a system on chip (SoC), a central processing unit (CPU), a network processor (NP), a digital signal processing circuit (digital signal processor, DSP), a micro controller unit (MCU), a programmable controller (programmable logic device, PLD), or another integrated chip. The processor may implement or perform the methods, the steps, and logical block diagrams that are disclosed in embodiments of this application. The general-purpose processor may be a microprocessor, or the processor may be any conventional processor, or the like. Steps of the methods disclosed with reference to embodiments of this application may be directly performed and completed by a hardware decoding processor, or may be performed and completed by using a combination of hardware and software modules in the decoding processor. A software module may be located in a mature storage medium in the art, for example, a random access memory, a flash memory, a read-only memory, a programmable read-only memory, an electrically erasable programmable memory, or a register. The storage medium is located in a memory, and the processor reads information in the memory and completes the steps in the foregoing methods in combination with the hardware of the processor.

The technologies described in this application may be implemented in various manners. For example, these technologies may be implemented by using hardware, software, or a combination of hardware and software. For an implementation by hardware, a processing unit executing these technologies on a communications apparatus (for example, a base station, a terminal, a network entity, or a chip) may be implemented in one or more general-purpose processors, DSPs, digital signal processing devices, ASICs, programmable logic devices, FPGAs, other programmable logic devices, discrete gates or transistor logic, discrete hardware components, or any combination thereof. The general-purpose processor may be a microprocessor. Optionally, the general-purpose processor may alternatively be any conventional processor, controller, microcontroller, or state machine. The processor may alternatively be implemented by a combination of computing apparatuses, such as a digital signal processor and a microprocessor, a plurality of microprocessors, one or more microprocessors with a digital signal processor core, or any other similar configuration.

It may be understood that the memory in embodiments of this application may be a volatile memory or a non-volatile memory, or may include both a volatile memory and a non-volatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), and is used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct Rambus RAM, DR RAM). It should be noted that, the memory in the system and method described in this specification includes but is not limited to these memories and any memory of another proper type.

All or some of the foregoing embodiments may be implemented by using software, hardware, firmware, or any combination thereof. When the software is used to implement the embodiments, all or some of the embodiments may be implemented in a form of a computer program product. The computer program product includes one or more computer instructions. When the computer instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a high-dense digital video disc (DVD)), a semiconductor medium (for example, a solid-state drive (SSD)), or the like.

It should be understood that "an embodiment" mentioned in the entire specification means that particular features, structures, or characteristics related to the embodiment are included in at least one embodiment of this application. Therefore, the embodiments in the entire specification are not necessarily same embodiments. In addition, these particular features, structures, or characteristics may be combined in one or more embodiments in any proper manner. It should be understood that sequence numbers of the foregoing processes do not mean execution sequences in embodiments of this application. The execution sequences of the processes should be determined based on functions and internal logic of the processes, and should not be construed as any limitation to the implementation processes of embodiments of this application.

It should be further understood that, in this application, "when" and "if" mean that UE or a base station performs corresponding processing in an objective situation, and are not intended to limit time, and the UE or the base station is not necessarily required to have a determining action during implementation, and do not mean any other limitation.

A person of ordinary skill in the art may understand that first, second, and various reference numerals in this application are merely distinguished for convenient description, and are not used to limit a scope of embodiments of this application, and also indicate a sequence.

In this application, unless otherwise specified, an element represented in a singular form is intended to represent "one or more", but is not intended to represent "one and only one". In this application, unless otherwise specified, "at least one" is intended to represent "one or more", and "a plurality of" is intended to represent "two or more".

In addition, the terms "system" and "network" may be used interchangeably in this specification. The term "and/or" in this specification describes only an association relationship for describing associated objects and represents that three relationships may exist. For example, A and/or B may represent the following three cases: only A exists, both A and B exist, and only B exists. A may be singular or plural, and B may be singular or plural.

The character "/" usually represents an "or" relationship between the associated objects.

The term "at least one of . . . " in this specification indicates all or any combination of listed items. For example, "at least one of A, B, and C" may indicate the following six cases: A exists alone, B exists alone, C exists alone, A and B coexist, B and C coexist, and A, B, and C coexist. A may be singular or plural, B may be singular or plural, and C may be singular or plural.

It should be understood that in embodiments of this application, "B corresponding to A" indicates that B is associated with A, and B may be determined based on A. However, it should further be understood that determining A according to B does not mean that B is determined according to A only; that is, B may also be determined according to A and/or other information.

A person of ordinary skill in the art may be aware that, in combination with the examples described in the embodiments disclosed in this specification, units and algorithm steps can be implemented by electronic hardware or a combination of computer software and electronic hardware. Whether the functions are performed by the hardware or the software depends on particular applications and design constraint conditions of the technical solutions. A person skilled in the art may use different methods to implement the described functions for each particular application, but it should not be considered that the implementation goes beyond the scope of this application.

It may be clearly understood by the person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, division into the units is merely logical function division and may be other division during actual implementation. For example, a plurality of units or components may be combined or integrated into another system, or some features may be ignored or may not be performed. In addition, the displayed or discussed mutual couplings or direct couplings or communications connections may be implemented through some interfaces. The indirect couplings or communications connections between the apparatuses or units may be implemented in electronic, mechanical, or other forms.

Units described as separate parts may or may not be physically separate, and parts displayed as units may or may not be physical units, may be located in one position, or may be distributed on a plurality of network units. Some or all of the units may be selected depending on actual requirements to achieve the objectives of the solutions in the embodiments.

In addition, functional units in embodiments of this application may be integrated into one processing unit, or each of the units may exist alone physically, or two or more units are integrated into one unit.

When the functions are implemented in the form of a software function unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes any medium, for example, a USB flash drive, a removable hard disk, a read-only memory (ROM), a random access memory (RAM), a magnetic disk, or an optical disc, that can store program code.

The foregoing description is merely a specific implementation of this application, but is not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   sending, by a first station (STA) in a station multi-link device (STA MLD), a first frame to an access point (AP) in an access point multi-link device (AP MLD), the first frame comprising first information indicating how often a STA in the STA MLD listens to a beacon frame when the STA is in a power saving mode,
   wherein how often the STA in the STA MLD listens to the beacon frame is indicated by using a time interval within which the STA in the STA MLD listens to the beacon frame,
   the time interval being related to a plurality of beacon frame intervals at which the AP MLD sends the beacon frame on a plurality of links, and the plurality of links corresponding to a plurality of STAs in the STA MLD participating in an association establishment process with the AP MLD; and
   receiving, by the first STA in the STA MLD, a second frame from the AP in the AP MLD.

2. The method according to claim 1, based on that a value of the time interval is greater than a threshold, the second frame carries a status code field set to Denied, and the status code field set to Denied indicates rejecting an association request of the first STA in the STA MLD.

3. The method according to claim 1, based on that a value of the time interval is 0, any STA in the STA MLD does not enter the power saving mode.

4. The method according to claim 1, wherein a unit of the time interval is a largest time interval of the plurality of beacon frame intervals.

5. The method according to claim 1, wherein the method further comprise:
   listening, by the STA in the STA MLD, the beacon frame within the time interval.

6. The method according to claim 1, wherein the first frame requests to associate the plurality of STAs in the STA MLD with the AP MLD.

7. The method according to claim 1, wherein the first frame is an Association Request frame, and the second frame is an Association Response frame; or
   wherein the first frame is a ReAssociation Request frame, and the second frame is a ReAssociation Response frame.

8. The method according to claim 7, wherein the first information is carried in a listen interval field of the Association Request frame, or
   wherein the first information is carried in a listen interval field of the ReAssociation Request frame.

9. The method according to claim 1, wherein the first information enables the AP MLD to determine lifetime of a cache service of the STA MLD.

10. The method according to claim 1, wherein the first information enables the AP MLD to determine an age function to determine whether to discard a cache service of the STA MLD.

11. A station multi-link device (STA MLD), comprising a first station (STA), wherein the first STA in the STA MLD is configured to:
    send a first frame to an access point (AP) in an access point multi-link device (AP MLD), the first frame comprising first information indicating how often a STA in the STA MLD listens to a beacon frame when the STA is in a power saving mode,
    wherein how often the STA in the STA MLD listens to the beacon frame is indicated by using a time interval within which the STA in the STA MLD listens to the beacon frame,
    the time interval being related to a plurality of beacon frame intervals at which the AP MLD sends the beacon frame on a plurality of links, and the plurality of links corresponding to a plurality of STAs in the STA MLD participating in an association establishment process with the AP MLD; and
    receive a second frame from the AP in the AP MLD.

12. The STA MLD according to claim 11, based on that a value of the time interval is greater than a threshold, the second frame carries a status code field set to Denied, and the status code field set to Denied indicates rejecting an association request of the first STA in the STA MLD.

13. The STA MLD according to claim 11, based on that a value of the time interval is 0, any STA in the STA MLD does not enter the power saving mode.

14. The STA MLD according to claim 11, wherein a unit of the time interval is a largest time interval of the plurality of beacon frame intervals.

15. The STA MLD according to claim 11, wherein the first frame requests to associate the plurality of STAs in the STA MLD with the AP MLD.

16. The STA MLD according to claim 11, wherein the first frame is an Association Request frame, and the second frame is an Association Response frame; or
   wherein the first frame is a ReAssociation Request frame, and the second frame is a ReAssociation Response frame.

17. The STA MLD according to claim 16, wherein the first information is carried in a listen interval field of the Association Request frame, or
   wherein the first information is carried in a listen interval field of the ReAssociation Request frame.

18. The STA MLD according to claim 11, wherein the first information enables the AP MLD to determine lifetime of a cache service of the STA MLD.

19. The STA MLD according to claim 11, the first information enables the AP MLD to determine an age function to determine whether to discard a cache service of the STA MLD.

20. The STA MLD according to claim 11, the STA in the STA MLD listens to the beacon frame within the time interval.

* * * * *

UNITED STATES PATENT AND TRADEMARK OFFICE
CERTIFICATE OF CORRECTION

PATENT NO. : 11,882,514 B2
APPLICATION NO. : 17/965457
DATED : January 23, 2024
INVENTOR(S) : Gan et al.

It is certified that error appears in the above-identified patent and that said Letters Patent is hereby corrected as shown below:

In the Specification

In Column 11, Line 43, delete "6o" and insert -- 60 --.

Signed and Sealed this
Ninth Day of April, 2024

Katherine Kelly Vidal
*Director of the United States Patent and Trademark Office*